United States Patent [19]

Simpson

[11] Patent Number: 4,597,234

[45] Date of Patent: Jul. 1, 1986

[54] STANDING SEAM ROOF ASSEMBLY

[75] Inventor: Harold G. Simpson, Oklahoma City, Okla.

[73] Assignee: Harold Simpson, Inc., Oklahoma City, Okla.

[21] Appl. No.: 568,083

[22] Filed: Jan. 4, 1984

Related U.S. Application Data

[63] Continuation-in-part of Ser. No. 481,844, Apr. 4, 1983, Ser. No. 428,568, Sep. 30, 1982, Ser. No. 428,459, Sep. 30, 1982, Pat. No. 4,503,653, Ser. No. 378,241, May 14, 1982, Pat. No. 4,528,789, and Ser. No. 326,144, Nov. 30, 1981, Pat. No. 4,472,920.

[51] Int. Cl.$^4$ ............................................. E04B 5/52
[52] U.S. Cl. ........................................ 52/478; 52/520; 52/551; 52/537
[58] Field of Search ................. 52/478, 537, 551, 520

[56] References Cited

U.S. PATENT DOCUMENTS

| | | | |
|---|---|---|---|
| 4,099,356 | 7/1978 | Graham | 52/520 |
| 4,250,678 | 2/1981 | Skuran | 52/478 |
| 4,329,823 | 5/1982 | Simpson et al. | 52/407 |
| 4,361,993 | 12/1982 | Simpson et al. | 52/222 |
| 4,361,998 | 12/1982 | Ellison et al. | 52/520 |
| 4,400,922 | 8/1983 | Boyer | 52/478 X |
| 4,466,224 | 8/1984 | Hague | 52/520 X |
| 4,497,151 | 2/1985 | Simpson et al. | 52/467 X |
| 4,524,554 | 6/1985 | Simpson et al. | 52/693 |

OTHER PUBLICATIONS

Brochure Sheet on the Klip-Rib System by ASC Pacific, Inc.

Primary Examiner—Carl D. Friedman
Attorney, Agent, or Firm—Bill D. McCarthy

[57] ABSTRACT

The present invention provides an improved standing seam roof assembly comprising first and second corrugation crowns formed in a roof panel along opposing sides of a medial panel portion, each of these corrugation crowns having tab engaging protrusions disposed along the medial panel portion. A pair of spaced apart retaining tabs are supported beneath the roof panel to receive the tab engaging protrusions, and retaining struts are disposed above the roof panel for preventing disengagement with the retaining tabs to maintain securement of the medial panel portion to the underlying structure in its assembled position. Also, an improved female/male interlock seam assembly is provided, as well as an improved butt joint assembly. An insulation cutter and improved Z purlin design are featured as well.

24 Claims, 27 Drawing Figures

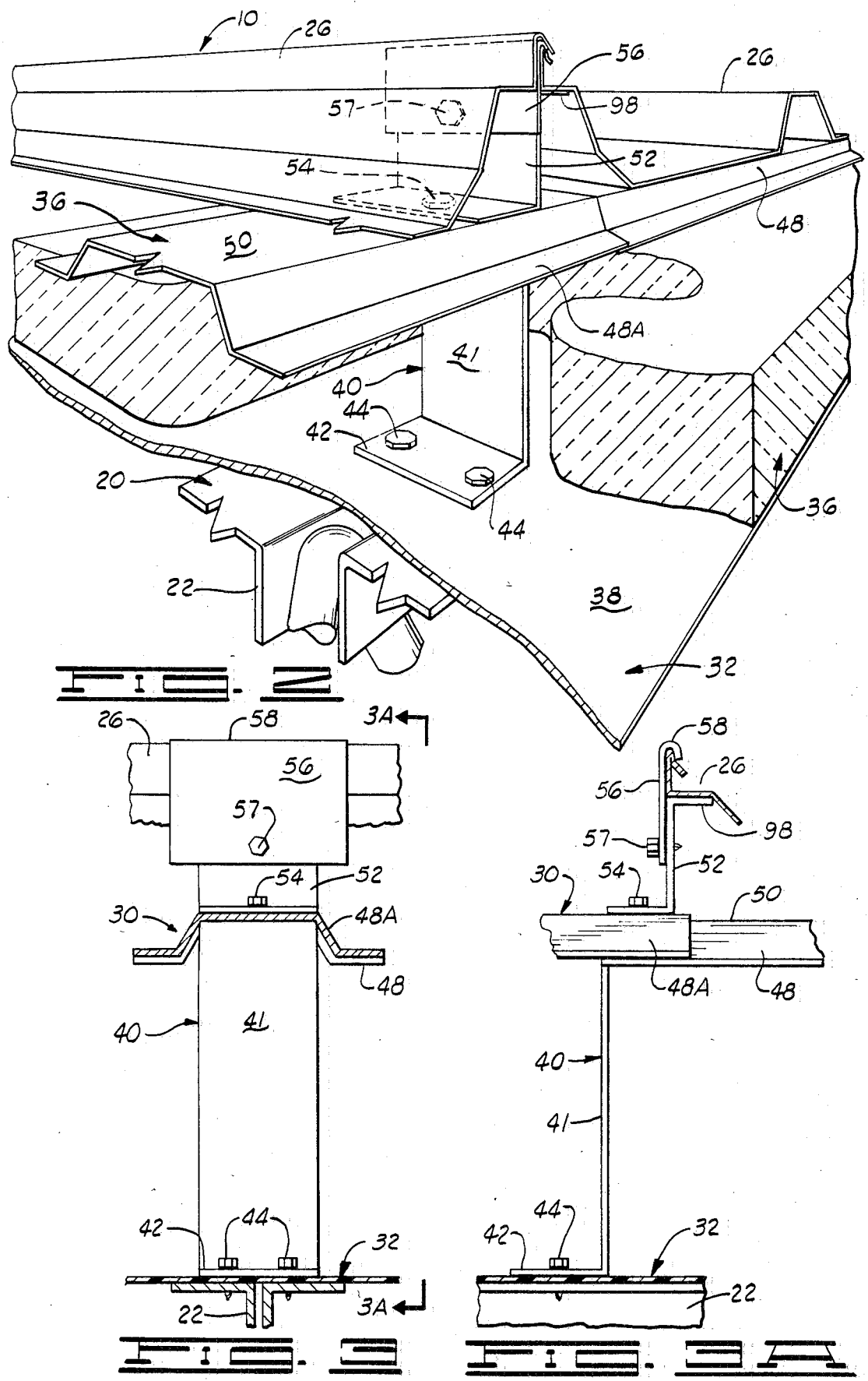

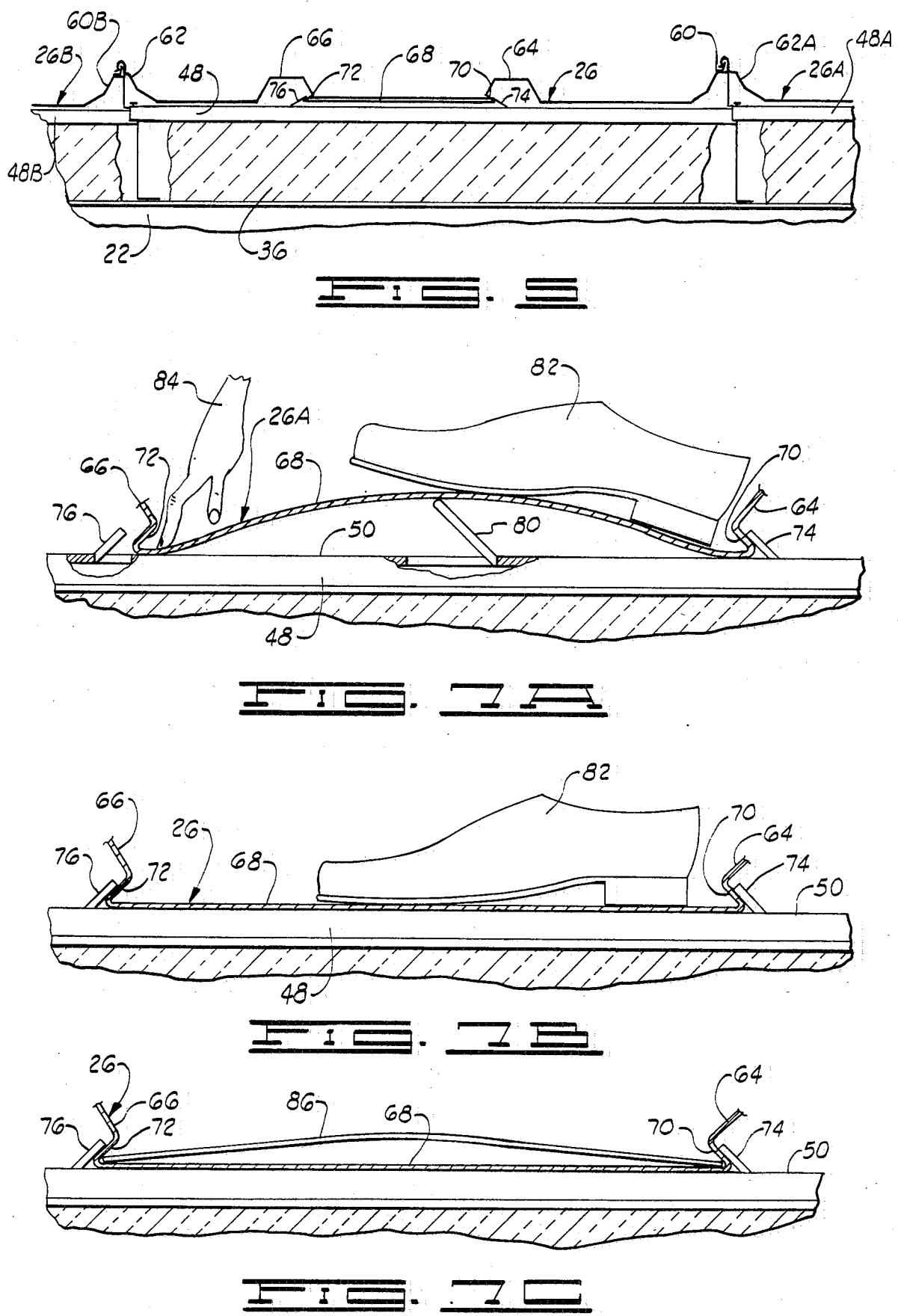

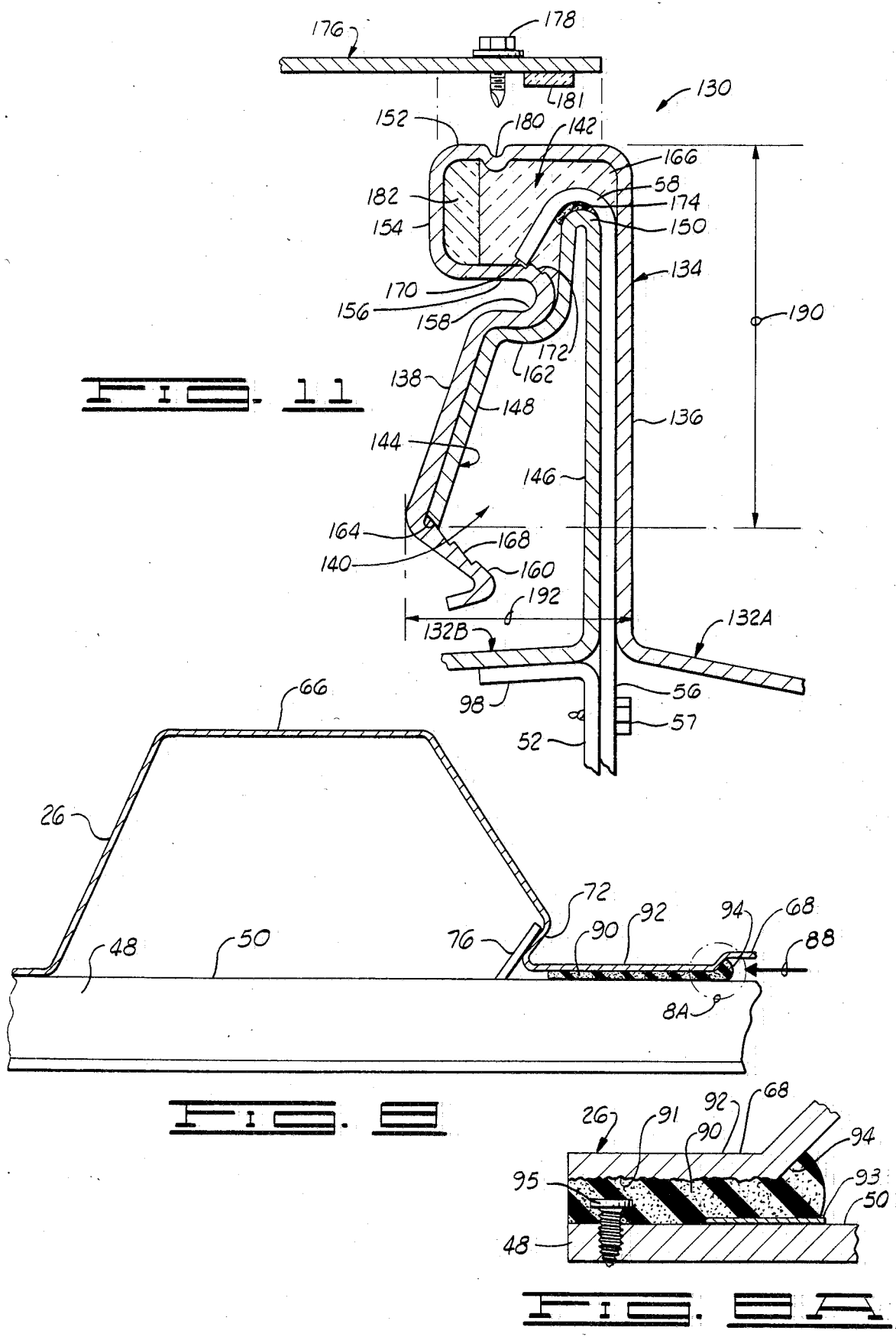

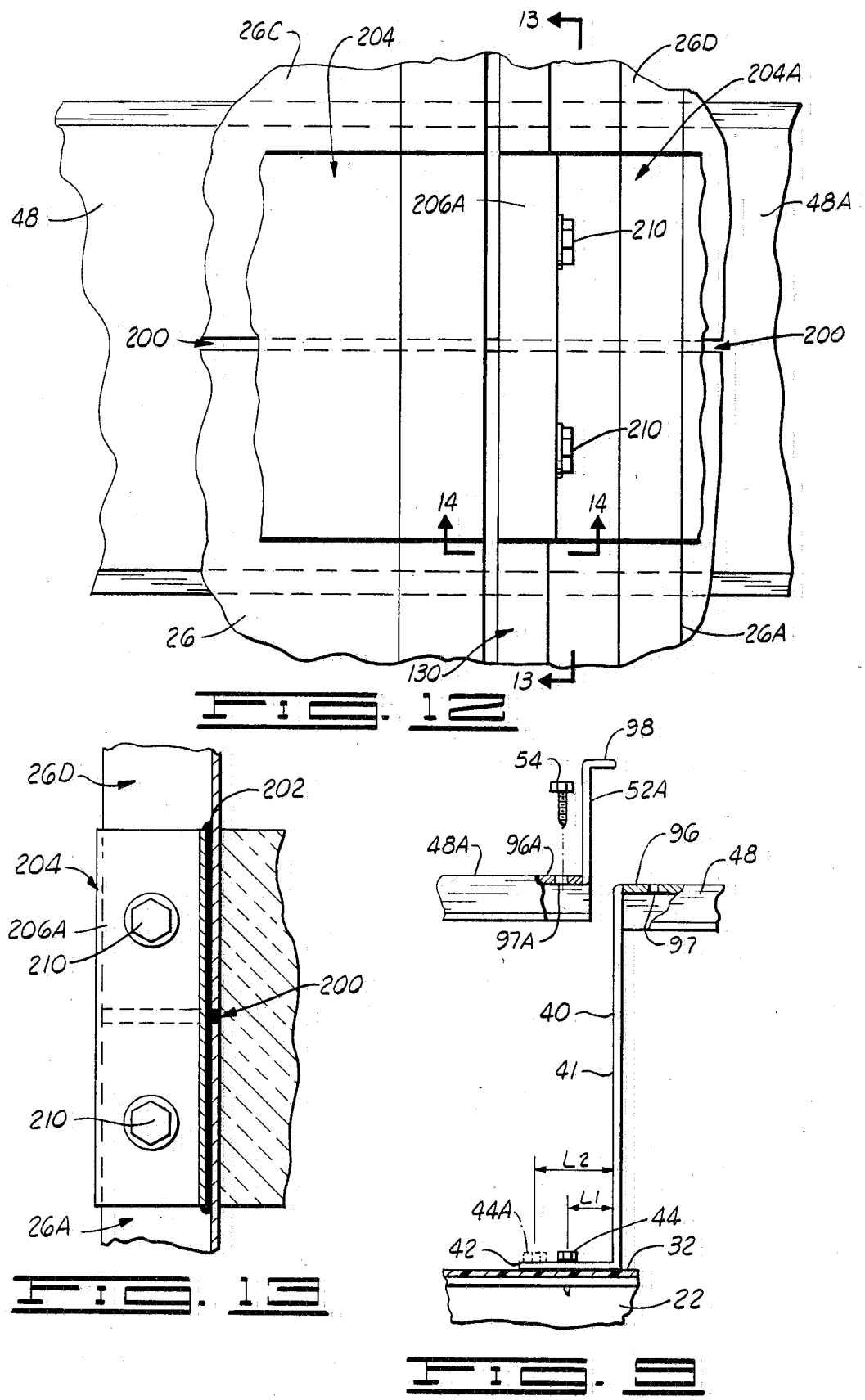

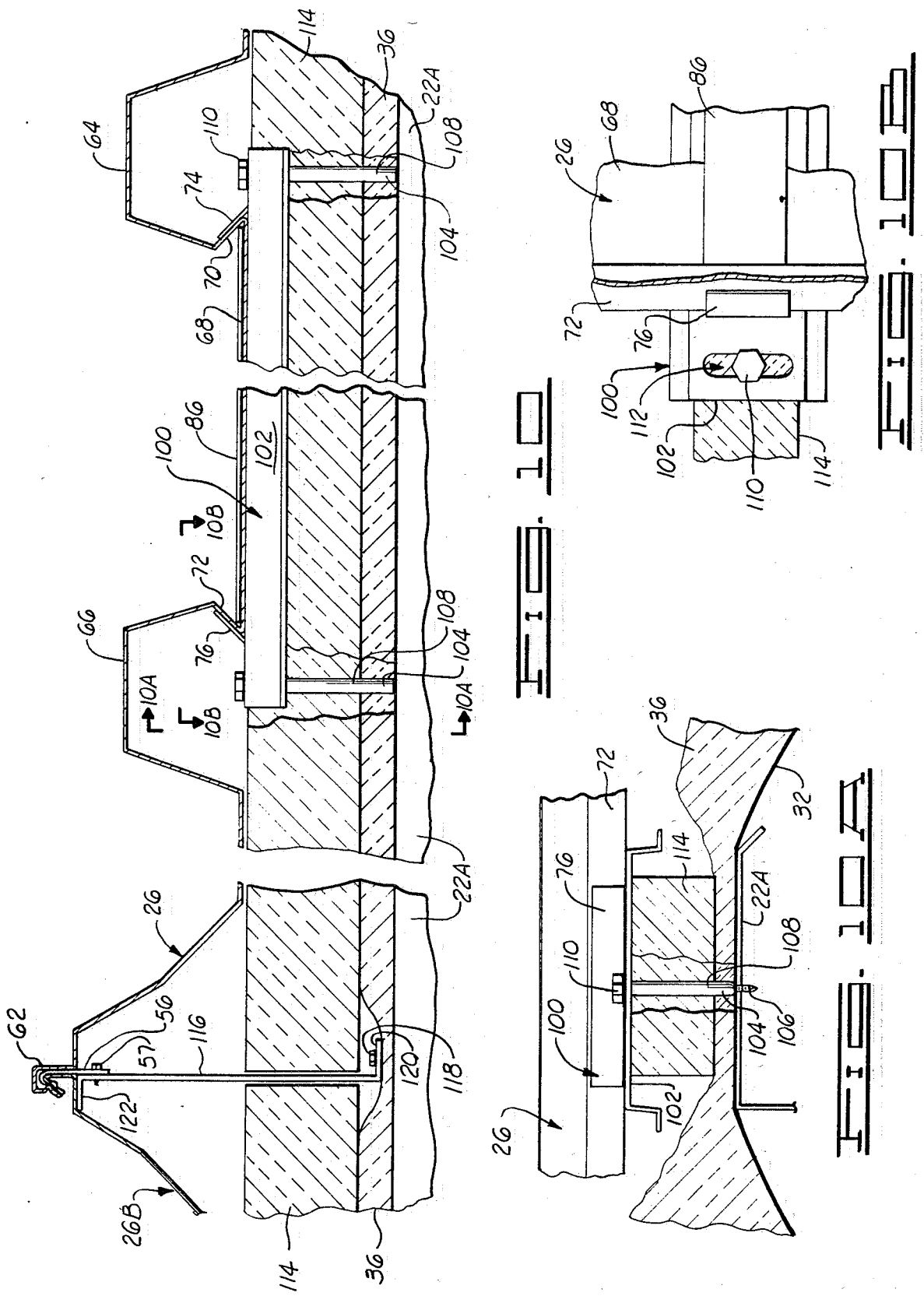

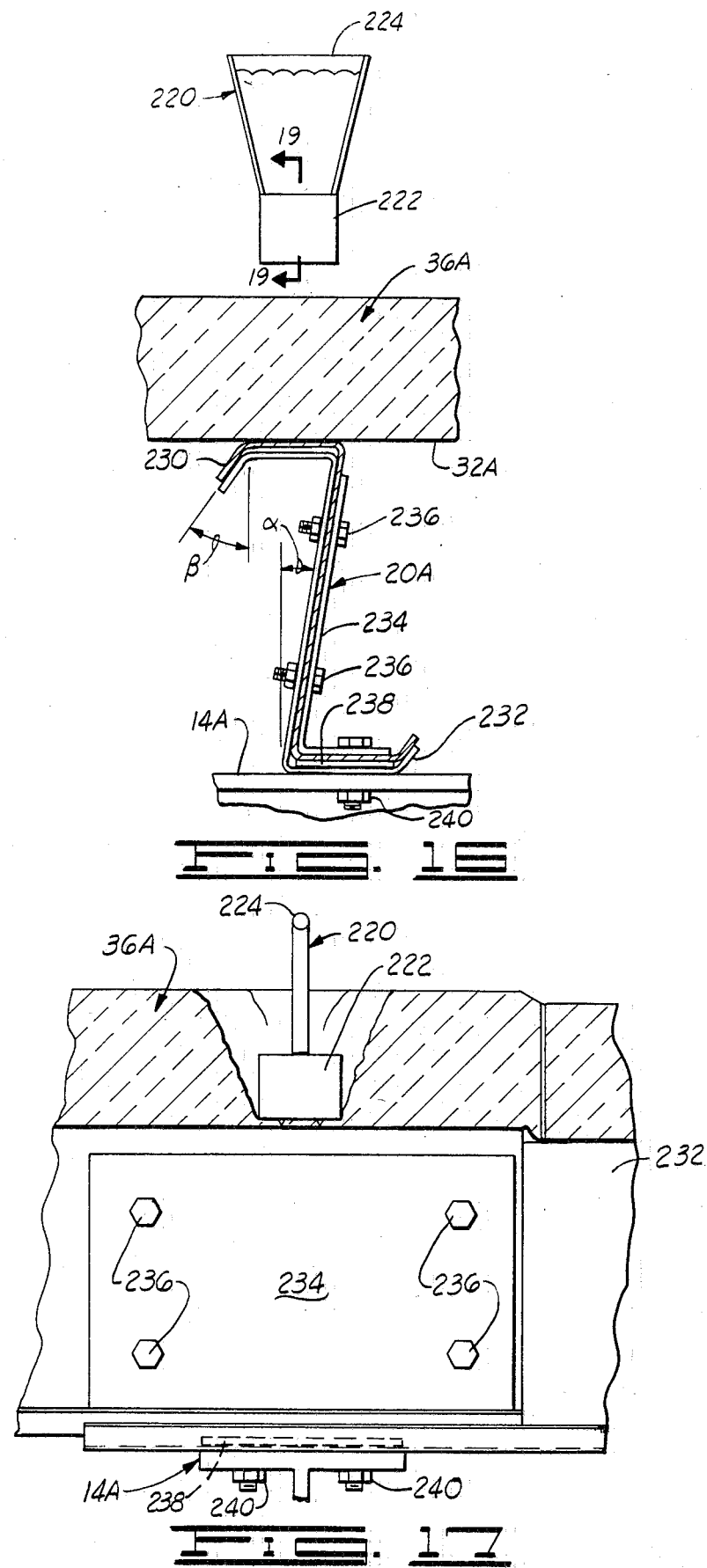

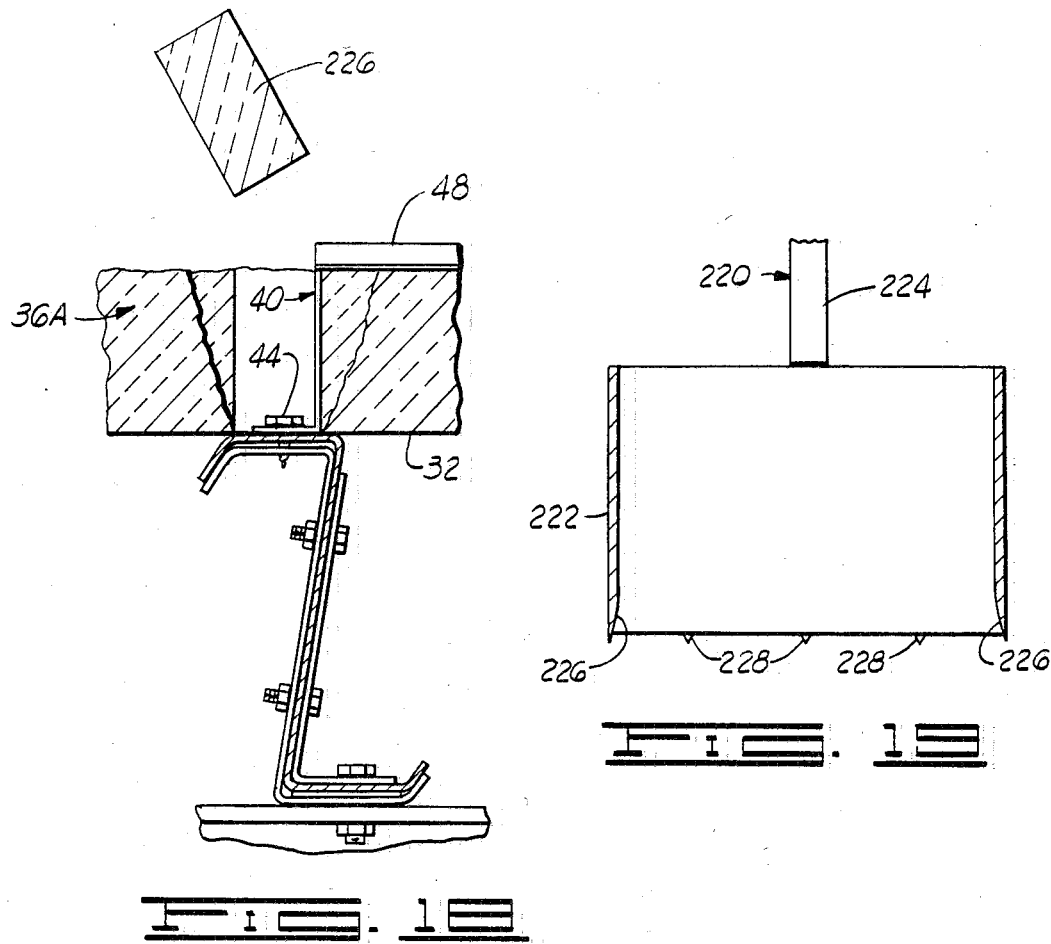
FIG. 18
FIG. 19
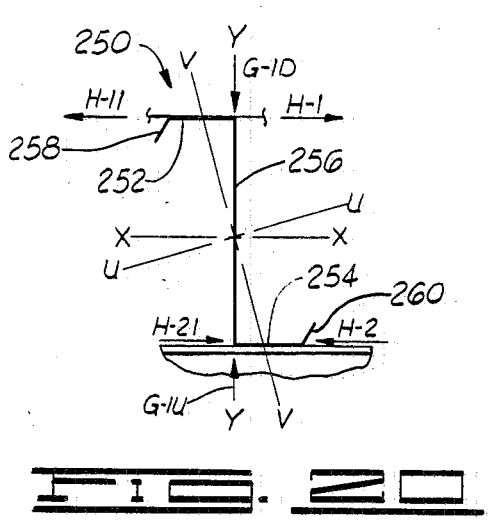
FIG. 20
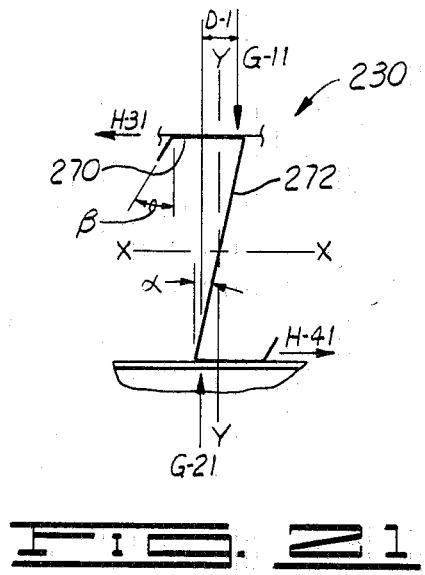
FIG. 21

STANDING SEAM ROOF ASSEMBLY

CROSS REFERENCE TO RELATED APPLICATIONS

The present application is a continuation-in-part to U.S. patent application Ser. No. 481,844 filed Apr. 4, 1983 and now pending; to U.S. patent application Ser. No. 428,568 filed Sept. 30, 1982 and now pending; to U.S. patent application Ser. No. 428,459 filed Sept. 30, 1982 and now U.S. Pat. No. 4,503,653; to U.S. patent application Ser. No. 326,144 filed Nov. 30, 1981 and now U.S. Pat. No. 4,472,920; and to U.S. patent application No. 378,241 filed May 14, 1982 and now U.S. Pat. No. 4,528,789.

BACKGROUND OF THE INVENTION

1. Field of the Invention

The present invention relates to the field of pre-engineered building systems, and more particularly, but not limited to, an improved standing seam roof assembly and components thereof.

2. Discussion of Prior Art

The pre-engineered building industry has developed into a multi-billion dollar segment of the building construction industry in the United States, and it has experienced an increasingly greater share of the construction industry budget throughout the world. The established method of erecting the roof of a pre-engineered building is to erect the primary structural members; attach the secondary structural members to the primary structural members; secure the appropriate bracing members; roll blanket-type insulation across the secondary structural members; dispose roof panel members over the insulation; and connect the roof panel members to each adjacently disposed roof panel member and to the secondary structural members.

Numerous types of roof assemblies have heretofore been proposed for a pre-engineered building in an effort to provide a watertight roof assembly, while at the same time enabling the roof assembly to expand and contract as changes in temperature are encountered. Typical of such a prior art roof assembly which has met with considerable success in recent years is the standing seam roof assembly. The panel members of the standing seam roof assembly are joined to each other along adjacent sides such that the sides are lapped together to form the standing seams. The panel members of the standing seam roof are secured to the secondary structural members by means of clips. The interconnection of the panel members of the standing seam roof lend stiffness and strength to the roof structure, while allowing the roof structure to expand and contract as a function of the coefficient of expansion of the materials of which the roof panels are made and the temperature cycles to which the roof panels are exposed.

The repeated action of expansion and contraction on the panel members of the roof assembly tends to weaken the panel-to-panel-to-lap joint and thus often causes panels to separate, structural failure and leaks in the roof assembly. The leaks are generally caused by the weakening of the fastening members and working or kneading of the sealant used at the joints. In many of the prior art roof assemblies, the sealant employed required adhesion, flexibility and water repellency. Further, the design of the joint was in many instances such that the pressure on the sealant varied greatly throughout the length of the side lap and end lap joints of the panels and resulted in uneven distribution of the sealant and voids in the joints which frequently led to leaks.

Many of the before-mentioned problems encountered in the prior art standing seam roof assemblies, such as structural failures and leaks, have been overcome by the improved standing seam metal floating roof assembly disclosed in copending U.S. patent application Ser. No. 425,477, filed Sept. 28, 1982 and now U.S. Pat. No. 4,497,151. The standing seam floating roof assembly of the before-mentioned copending patent application is formed of elongated metal panels, each of which is provided with a female member formed along one side portion of the panel and a male member formed along the opposed side portion of the panel such that adjacent panels are interlocked with the female and male members thereof to form the standing seam. A clip standing seam of the roof assembly and the secondary structure such that the upper portion of the clip is disposed between the male and female members of the panels forming a standing seam. The clip is further constructed so that relative motion between the clip and the metal panels is substantially prevented. To assist in the watertightness of the standing seam a resilient material is disposed in the upper portion of the standing seam between the female member and the male member.

Furthermore, pre-engineered roof systems are constructed of identical sheet metal panels that are laid end to end, as well as side by side as discussed above. This presents the problem of sealing these butt joints, especially at the "four corner" areas where four of the panels are adjacent. Various butt joining techniques have evolved in the prior art, all of which involve overlapping and selective notching to achieve a near fitting joint, and liberal application of mastic to effect the best seal possible under the design circumstances. Serious deficiencies have been encountered in all known prior art butt joints, such as water leaks, high costs, tooling complications, packaging, etc.

The insulation of a pre-engineered building presents another major problem in the construction of such buildings. My U.S. Pat. No. 4,361,993, entitled "Frameless Enclosure Assembly" issued Dec. 7, 1982, addresses this problem, as does my U.S. Pat. No. 4,329,823 entitled "Support Spacer Apparatus" issued May 18, 1982, address the problems incurred with maintaining full insulation integrity throughout the roof and wall systems of pre-engineered buildings and the like.

The problem incurred with maintaining structural stability under varying load conditions on present day pre-engineered roofs is addressed by my U.S. Pat. No. 4,524,554 entitled "Structural Bracing System" issued June 25, 1985. Purlins are long T-shaped or C-shaped members that are bolted to extend across the primary structure of a pre-engineered building. A roof assembly is constructed over the purlins and over the layered insulation battings and roofing panels attached to the tops of the purlins. Metal panel roofs supported by the underlying purlins must transfer load to the primary building structure through the purlins. This load will be both from live loads (ambient elements of nature, repairmen, temporarily stored roofing materials, etc.) and from dead lads (permanently installed air conditioners, etc.). It is in particular the live load conditions which alternately place building purlins in tensional and compressive stress.

SUMMARY OF THE INVENTION

The present invention provides an improved standing seam roof assembly in which side lapped panels are disposed in side-to-side and interlocking relationship over underlying building structural members to form the roof of a building system, such as a pre-engineered metal building and the like. The standing seam roof assembly comprises a laterally flexible roof panel member having a first side lap joint portion along one side of the roof panel member and a second side lap joint portion along an opposing second side thereof, and having a non-penetrating panel attaching assembly disposed to engage a medial panel portion of the roof panel. The first and second side lap joint portions are, respectively, female and male side lap joints, interlock with contiguously disposed roof panels of similar construction to provide on each side of the roof panel female/male interlock seam assembly. Said panel attaching assembly comprises a pair of parallel and spaced apart corrugation crowns formed along a length of the roof panel member, each of said corrugation crowns having a tab engaging protrusion formed at the juncture of the corrugation crown and the medial panel portion of the roof panel member, and a pair of spaced apart retainer tabs supported by underlying structure and disposed to extend angularly upwardly therefrom such that the corrugation crowns are disposed in retaining engagement when the tab engaging protrusions are forced into simultaneous abutting engagement with the retaining tabs by selective lateral flexing of the roof panel member, and a retaining mechanism disposed to prevent flexing disengagement of the tab engaging portions and the retaining tabs to effect non-penetrating securement of the medial portion of the panel to the underlying building support structure.

In other features of the present invention, an improved standing seam joint assembly is provided wherein the interlocking relationship of the mating first and second side lap joint members resist disengagement that might otherwise occur by the joint rotation or moment forces resulting from uplift forces imposed on a roof panel. The female side lap joint has a mastic cavity portion of the insertion cavity formed thereby, and has a leg portion having a shoulder stop and an edge engaging ramp formed thereon. The male side lap joint has a leg portion having an apex portion, a shoulder engaging portion and a ramp engaging edge.

In the interlocked position of the standing seam joint assembly, panels of similar construction are disposed in contiguous relationship such that the flats thereof are substantially coplanar and such that the male side lap joint of one such panel is matingly received by the female side lap joint of the contiguous panel, and in the interlocked position, the apex portion of the male side lap joint is disposed to extend into the mastic cavity portion of the insertion cavity of the female side lap joint, with the shoulder and edge engaging ramp respectively abuttingly engaging the shoulder engaging portion and the ramp engaging edge such that force may be transferred through the assembled joint without causing displacement of or being transferred through the mastic or altering the relative position of the apex of the male side lap print as it is fixed in the mastic cavity.

The mastic cavity is configured so that it contains a volumetric release area. The volumetric release area provides an area configured so that as the male apex and clip are inserted into mastic cavity portion the mastic is displaced and easily transferred into the volumetric release area. The volumetric release area may contain air or some other relatively easily displaced material such as foam material.

Further, the present invention provides a non-lapped end joint assembly wherein the ends of the roof panel members, instead of being overlapped at the end joints, are placed end to end with a mastic gap disposed therebetween. A relatively narrow cinch strap member and mastic are disposed over the end joint, an underlying joint support member is disposed beneath the joint, and a connecting mechanism effects gripping engagement of the cinch strap and the panel ends to effect securement thereof and selective mastic dispersement which includes the filling of the mastic gap between panel ends.

Accordingly, an object of the present invention is to provide an improved standing seam roof assembly in which a non-penetrating panel attaching assembly is provided for securement of the medial portion of a roof panel member to underlying support structure.

Another object of the present invention, while achieving the above stated object, is to provide an improved standing seam roof assembly having interlocking side lap joints which resist disengagement by uplift wind forces imposed on the medial portion of the roof panels thereof.

Yet another object of the present invention, while achieving the above stated objects, is to provide an improved end joint assembly whereby the roof panel members thereof are placed end to end in non-lapping relationship.

A further object of the present invention while achieving the above stated objects, is to provide an improved standing seam roof assembly that is less costly to fabricate, is more readily installable by semi-skilled workers, and which is less costly to maintain, while providing efficient thermal insulation of the building structure.

Other objects, features and advantages of the present invention will become clear from a reading of the following detailed description when read in conjunction with the drawings and appended claims.

BRIEF DESCRIPTION OF THE DRAWINGS

FIG. 2 is a perspective, partial cut-away view showing some of the components of the roof system of FIG. 1.

FIG. 3 is an elevational end view of the underlying beam support member of the roof assembly of FIG. 1.

FIG. 3A is an elevational, side view taken at 3A—3A in FIG. 3.

FIG. 6 is an enlarged view depicting the profile of a portion of the medial portion of the standing seam roof panel member of the present invention.

FIGS. 7A through 7C depict the sequence of flexing the standing seam roof panel member and securing same to an underlying structure as taught by the present invention.

FIG. 8 is a view similar to FIG. 6 in which the use of an adhesive is illustrated as part of the present invention. FIG. 8A is an enlarged view taken at 8A—8A in FIG. 8.

FIG. 9 is a partial cutaway, elevational view of the connecting ends of a pair of interconnecting panel support beams.

FIG. 10 is an elevational view of an alternate panel support assembly. FIG. 10A is a view taken at 10A—10A and FIG. 10B is a view taken at 10B—10B in FIG. 10.

FIG. 11 is a cross-sectional, elevational view of an improved ocking side lap joint assembly.

FIG. 12 is a plan view of the four corner area of interlocking and abutting roof panels. FIG. 13 is an elevational view taken at 13—13.

FIG. 16 shows an elevational view of the insulation cutter of the present invention; FIG. 17 depicts the insulation cutter in its cutting mode; and FIG. 18 shows a cross-sectional, elevational view of the cut and removed insulation plug effected by the insulation cutter.

FIG. 19 is a cross-sectional view of the insulation cutter taken at 19—19 in FIG. 16.

FIG. 20 is a schematic, cross-sectional view of a typical prior art Z purlin. FIG. 21 is a schematic, cross-sectional view of an improved purlin constructed in accordance with the present invention.

DESCRIPTION

Figure 1:
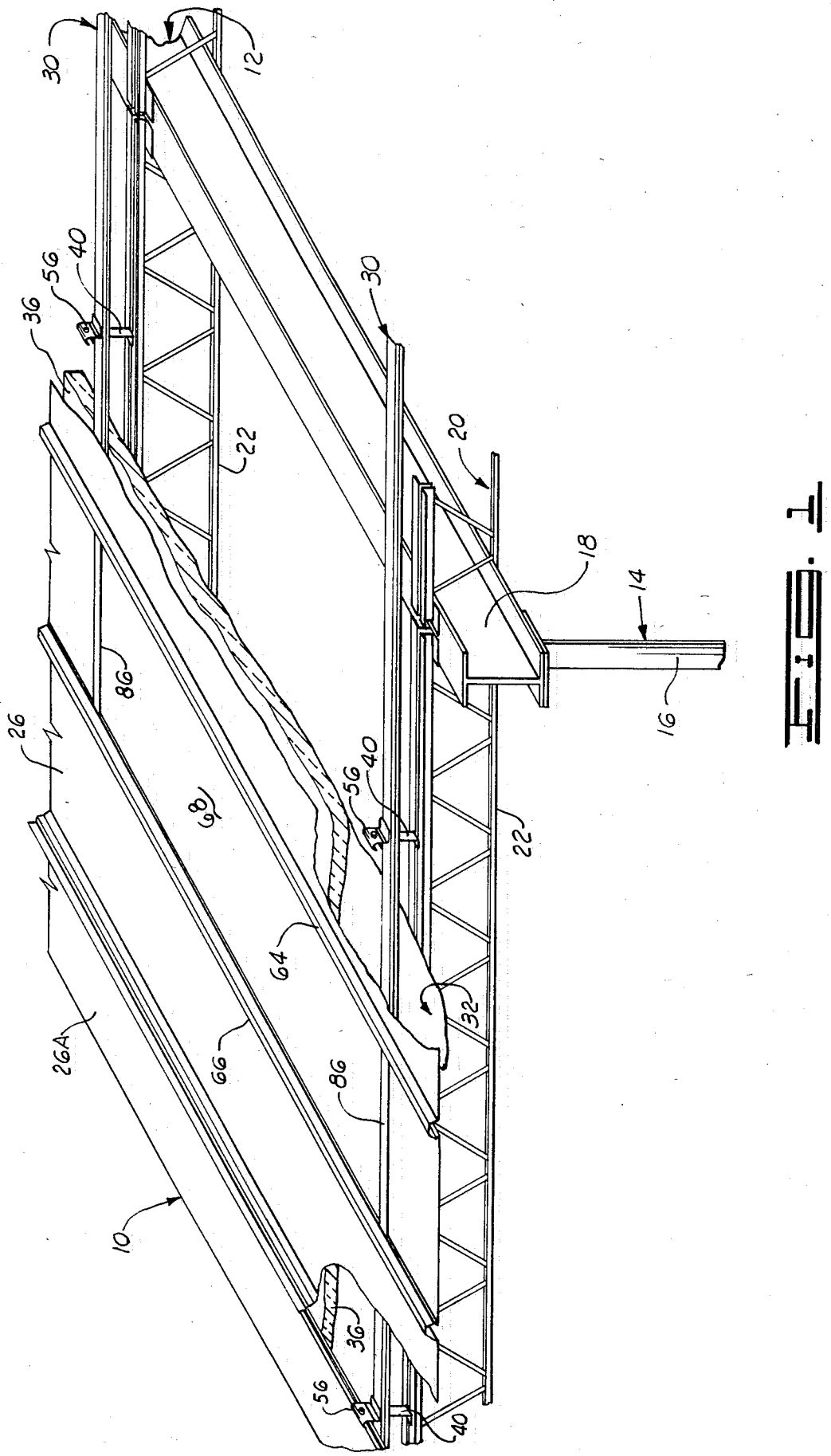
FIG. 1 is an isometric, partial cut-away view of a portion of a roof system utilizing the standing seam roof assembly of the present invention.

My above referenced patents provide a description of a pre-engineered building constructed and insulated in accordance with established methods of erection, and also, teach my improvements thereto. For brevity, the teachings of those patents are not repeated herein; rather, the descriptions contained in those patents are incorporated herein by reference.

For example, my earlier issued U.S. Pat. No. 4,329,823, entitled "Support Spacer Apparatus", described the conventional method of erecting a pre-engineered building, such as the pre-engineered building depicted in the drawings of that patent, and also taught improvements thereto including the use of a spacer member having a plurality of fastener assemblies extendable through the insulation to support roof panels and the like a predetermined distance from the supporting substrate such that the insulation disposed therebetween retains its prepenetration state after attachment of the fastener assemblies to the substrate.

Also, my U.S. Pat. No. 4,361,993, entitled "Frameless Enclosure Assembly", taught the attachment of a facing membrane and extending same substantially taut between support members, with compressible insulation material supported by the facing membrane, and panel members positioned over the insulation and secured to the building structure assembly via panel securing assemblies, for example of the type taught in my earlier mentioned patent.

Further, my U.S. patent application No. 378,241 entitled "Insulated Roof System", filed May 14, 1982, taught the use of a tertiary structure assembly supported by the building structure and extensive therefrom to support the panel members which were attached thereto, with the insulation material supported by the underlying flexible membrane. All of these earlier teachings of my inventions have dealt with improving the art dealing with roofing and insulation systems, of which the present invention is a further progression of that art.

My U.S. patent application No. 326,144 entitled "Scored Insulation System," filed Nov. 30, 1981, taught the scoring of blanket insulation material to provide abrupt transition between the expanded insulation and tab portions which are used for membrane attachment. The present invention includes a cutting tool which can cut expanded insulation to minimize compression zones surrounding clip fasteners.

Also, my U.S. Pat. No. 4,524,554, issued June 25, 1985, taught the use of selectively placed braces that serve to transfer load such that the load carrying capacity of the purlins is increased. Specifically, this result is achieved by substantially restricting the translation and rotation of the purlins.

For an understanding of the present invention, an isometric view of a partial cut-away roof system is shown in FIG. 1 in which a portion of a pre-engineered building roof 10 is supported by a pre-engineered building structure 12. The pre-engineered structure 12 comprises a primary structural system 14 which consists of a plurality of upwardly extending column members 16 that are rigidly connected to a foundation (not shown). Also, the primary structural system 14 has a plurality of primary beams 18 which are generally horizontally disposed and supported by the column members 16.

A secondary structural system 20 comprises a plurality of open web beams 22, also referred to herein as bar joists, are supported by the primary beams 18 and are also generally horizontally disposed. While C or Z purlins or wood beams could as well be used as the secondary structurals in the practice of the present invention, FIG. 1 shows the present invention supported on the bar joists 22.

A plurality of roof panels 26 are supported over the secondary structural assembly 20 by a plurality of panel support assemblies 30 described further hereinbelow, and which are attached to the upper flanges of the bar joists 22. The roof panels 26, only portions of which are shown, are depicted as being standing seam panels, with their interlocking edge seams being supported by clip portions of the panel support assemblies 30, as will become clear below. A conventional, standing seam roof panel, on the average, is about thirty-five feet long and about twenty-four inches wide, although other lengths and widths are common. Typically, a standing seam roof panel member is made of 24-gauge sheetmetal material, and because of the relative thinness of the metal, corrugations are commonly formed running lengthwise in the panel to provide sufficient strength for load bearing. Further, typical prior art standing seam roof panels are secured at the interlocking side lap joints and at the end overlap of contiguous panels. Fastener penetration of the panels, except at the end overlaps, is avoided to minimize leakage points. The medial portions of the panels located between standing seam joints are not normally secured to the underlying structural members, there being many disadvantages to doing this with current technology. Such roof panels are inherently laterally flexible but longitudinally inflexible. Because the panel is usually placed transverse to the roof, if the panels are joined rigidly end to end and attached rigidly to the underlying secondary structure much damage is caused by differential deflection between the two.

The panel width and material thickness are dictated by the inwardly and outwardly directed load requirements imposed by regulatory, insurance and good engineering requirements, other factors being equal, the material thickness required normally being greater for outwardly directed load than inwardly directed load. The reason for this is that the panel is more fully supported by the underlying secondary support for inwardly directed load than for outwardly directed load, the support points for outwardly directed load being located only at points of attachment of the panel to the secondary structural. Past practices have limited these points of attachment to places such as panel edge points where attachment could be made without causing additional holes in the panel. Several attempts have been made to devise intermediate corrugation and corresponding clips to hold the center of the panel to the underlying structural. These attempts have met with limited success because the outwardly directed force bows the center of the panel outward as load is applied and causes the clip to become disengaged. The present invention provides for non-penetrating attachment of medial panel portions to underlying structural members, and thus while maintaining equivalent panel quality, provides the capability of using thinner gauge material and wider panels, while at the same time eliminating through fasteners so as to reduce roof leak potential and the adverse effects of differential expansion and contractions. This represents considerable benefit and time and cost savings to the pre-engineered building art.

Preferably, as depiected in FIGS. 1 and 2, a flexible membrane 32 is extended substantially tautly over the bar joists 22 beneath the panel support assemblies 30 and secured thereby to the top flanges of the bar joists 22. A layer of compressible insulation 36 is supported by the flexible membrane 32 beneath the roof panels 26 in substantially its pre-installed expanded state.

While the above description provides an overview of the structural components of the insulated roof systems taught by my previously mentioned patents, the present invention will be more fully explained with reference to detailed drawings of the system and by describing the method of installation. And while the present invention is usable with other, conventional prior art standing seam roof installations where the panels are attached directly to the underlying bar joists or purlins, with the insulation material simply pinched between the roof panel members at the points of attachments thereto, the present invention is preferably used with panel support assemblies of the type designated 30 in FIG. 1, and with the other components described herein. As for the type of blanket insulation 36 to be used, it will be noted that such insulation is usually a laminated product that comprises a layer of compressible mineral insulation or chopped glass fiber insulation which is bonded via an adhesive to a flexible facing membrane. The facing membrane may consist of one or more thin layers of materials such as aluminum foil or vinyl plastic which serves a decorative purpose as well as providing a vapor barrier for the building envelope. A typical blanket batt insulation is made by the Mizell Brothers Company of Dallas, Tex. which is a product comprising a laminated facing membrane made of a layer of vinyl, a layer of fiberglass scrim, and a layer of aluminum foil. Bonded to the facing membrane is a thick layer of compressible fiberglass material.

However, as taught in my previously mentioned patents, the membrane 32 is preferably an independent member which serves to provide a continuous membrane vapor barrier and also serves as a support member for the insulation layer 36 which is simply placed thereupon during construction. In FIG. 2, the membrane 32 is a flexible facing like membrane preferably of about one to two mils in thickness and may have an embedded scrim such as fiberglass, nylon, or any material capable of taking tensile load. The flexible membrane 32 is installed over the secondary structural system 20 by attaching a first end of the membrane to a first support member and attaching a second end of the flexible membrane to a second support member so that the flexible membrane 32 extends substantially taut therebetween and whereby the membrane extends as a membrane plane over the top flanges of the bar joists 22. The ends of the insulation may be anchored to a building wall or roof structurals, in the manner taught in my previously mentioned patents.

The panel support assemblies 30, which can be fabricated of metal, plastic or combinations of metal/plastic materials, serve to secure the membrane 32 plurally to each of the bar joists 22 in the manner shown in FIG. 2 wherein is shown a portion of one of the panel support assemblies 30. Each of the panel support assemblies 30 is supported by one or more of the bar joists 22, and in combination, the panel support assemblies 30 serve to form a tertiary structural assembly which is connected to the building structural assembly and which supports the roof panel members 26 for at least partially enclosing the building structural assembly. The flexible membrane 32 has an insulation support side 38 on which the insulation layer 36 is disposed.

The panel support assembly 30 shown in FIG. 2, and also in FIGS. 3 and 3A, comprises a plurality of base clips 40, each of which has a median web portion 41. At the lower end of the median portion 41 there is formed a leg portion 42 through which self-drilling/self-tapping screws 44 extend to secure the base clip 40 to the underlying bar joists 22. As shown in FIG. 3, the attachment of the base clip 40 serves to secure the flexible membrane 32 to the top of the bar joists 22.

The panel support assembly 30 also comprises a plurality of panel support beams 48 that are generally elongated channel shaped members which are arranged in overlapping, end-to-end relationship such that the longitudinal axes thereof are substantially parallel to the underlying bar joists 22 when attached thereto. In FIGS. 2, 3 and 3A, the overlapping ends of two panel support beams 48, 48A are shown. Furthermore, it will be appreciated that, where desired, the panel support beam can be disposed to run perpendicularly to the underlying bar joists 22. Preferably, the base clip 40 is formed as an integral portion of the panel support beam 48 to which it is attached. That is, each of the base clips 40 is formed as an extension of the web portion of its channel shaped support beam 48 and is press formed to extend downwardly therefrom to support one end of its respective support beam 48 at a predetermined distance above the underlying bar joist 22. This is for the purpose of providing clearance below the panel support beam 48 in order to provide space for the insulation material 36 to be positioned thereunder, and further, each base clip 40 flexes between its web portion 41 and leg portions 42 to accommodate thermal expansion and contraction of the roof panels 26, as discussed more fully hereinbelow.

Figure 4:
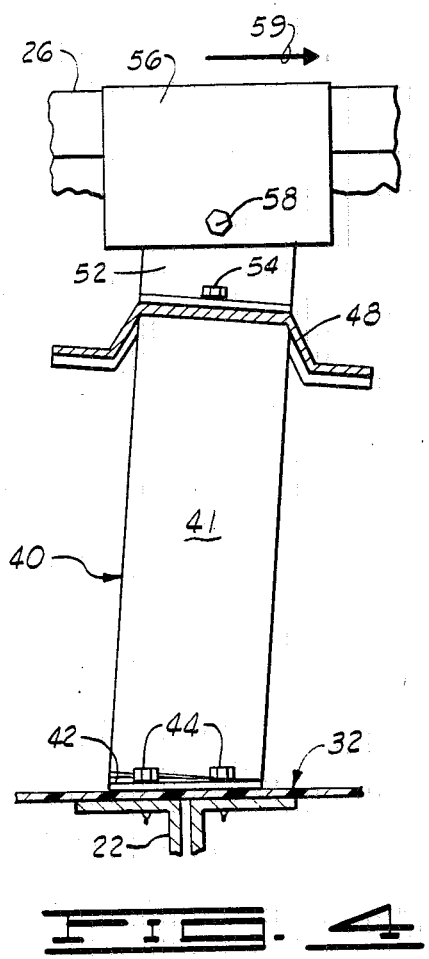
FIG. 4 is an end view similar to FIG. 3 except it depicts rotational movement of the base clips effected by the movement of the roof system due to thermal expansion or contraction thereof.

The roof panels 26 are secured to the panel support beams 48 and rest on an upper support surface 50 thereof which provide support for the medial portions of the roof panel members 26. As shown in FIGS. 3 and 3A (which show only the male side lap joint of one roof panel 26 in order to show the clip components fully), an upwardly extensive clip support member 52 is secured to the upper support surface 50 of the overlapped panel support beams 48, 48A via a screw 54. In turn, the clip support member 52 supports a hold down clip member 56 which is attached thereto via a bolt 57 that extends through an oversized aperture (not shown) in the hold down clip member 56 and attaches to the supporting clip support member 52. The oversized aperture in the hold down clip member 56 permits for some limited rotation of the hold down clip member 56 about the bolt 57 and is helpful in retaining firm gripping engagement with the standing seam roof panels as such are caused to move by environmental influences. The upper portion 58 is formed to hook over the apex portion of the male side lap joint of the roof panel member 26 as shown. Further, the median web portion 41 of the base clip 40, in conjunction with the limited rotational movement of the hold down clip member 56 permits the securing point of the panel members 26 to elastically rotate as longitudinal thermal expansion of the roof panels occurs. This is depicted in FIG. 4 in which the base clip 40 is shown in slightly rotational distortion as the panel 26 has been caused to move in the direction indicated by the arrow 59. Since the hold down clip member 56 can pivot about the bolt 57, the plane of the upper surface of the roof panel 26 can be maintained in substantial coplanar relationship to the upper surfaces of the flanges of the bar joists 22, thereby substantially avoiding the wrinkling that occurs in many conventional standing seam joint designs.

The roof system 10 is constructed on a pre-engineered building structure having the primary structural assembly 18 and the secondary structural system 20 which comprises the bar joists 22. Once the flexible membrane 32 is tautly secured to selected anchoring points and stretched over the bar joists 22, the base clips 40 of the panel support beams 48 are secured in place via the bolts 44, and the panel support beams 48 are overlappingly aligned along each of the bar joists 22. The standing seam roof panel members 26 are snapped into overlapping and interlocking relationship over the standoff clip members 56 in the manner depicted in FIGS. 1 through 3B. In similar fashion to that described for the erection of the roof panels 26 shown, the process of placing additional panels is repeated in interlocking fashion in the manner taught in my previously mentioned patents.

Figure 5:
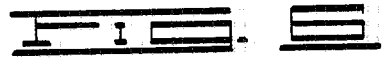
FIG. 5 is a schematic representation of a standing seam roof panel as secured to an underlying panel support assembly by the non-penetrating panel attaching assembly of the present invention.

Turning now to the further improvements of the present invention, a more detailed description of the roof panel members 26 is required. In FIG. 5 is shown an end schematic view depicting the profile of the roof panel members 26. In FIG. 5, in order to illustrate the profile geometry, the panel member 26 is shown interlocked with a contiguous roof panel member 26A on one side and with a contiguous roof panel member 26B on the other side thereof. The roof panel member 26 has a male side lap joint portion 60 formed along one side thereof, and a female side lap joint portion 62 formed along the other side thereof. In like fashion, the roof panel member 26A has male and female side lap joint portions formed along its sides, with only the female side lap joint portion 62A depicted in FIG. 5. Similarly, the roof panel member 26B has male and female side lap joint portions formed along its sides, with only the male side lap joint portion 60B being depicted in FIG. 5. In each of these roof panel members, the male side lap joint portion is lockingly receivable in the insertion cavity formed by the female side lap joint portion of a contiguous panel. In FIG. 5, the male side lap joint portion 60 is interlocked with the female side lap joint portion 62A. Also, the male side lap joint portion 60B of the roof panel member 26B is interlocked with the female side lap joint portion 62 of the roof panel member 26.

Each of the roof panels, as illustrated by the roof panel member 26 in FIG. 5, has a first corrugation crown 64 formed in the medial portion of the panel, and a second corrugation crown 66 formed in the medial portion of the panel and substantially parallel to the first corrugation crown 64. Disposed between the first and second corrugation crowns 64, 66 is the medial portion 68 of the roof panel member 26. Of course, the forming of corrugation crowns running the length of a roof panel is the conventional manner of adding load bearing strength to light gauge sheetmetal, but the shape of the first and second corrugation crowns 64, 66 differs from conventional corrugations. Disposed along the juncture of the first corrugation crown 64 and the medial portion 68 is a first tab engaging protrusion 70, and disposed along the juncture of the second corrugation crown 66 and the medial portion 68 is a second tab engaging protrusion 72. An enlarged view of the second corrugation crown 66 is shown in FIG. 6, in which is shown a better view of the second tab engaging protrusion 72.

Returning to FIG. 5, a pair of spaced apart, retaining tabs 74 and 76 are disposed to extend angularly upwardly from the underlying panel support beam 48, as also shown in FIG. 7A. These retaining tabs may be integrally formed in the upper support surface 50 of the panel support beams 48 and bent angularly upward as shown in FIG. 7A, or they may be separate members such as the retaining tab 76A shown in FIG. 6 and secured to the upper surface 50 via a bolt 78.

The first and second retaining tabs 74, 76 are spaced apart a distance that is just slightly greater than the distance between the outer apexes of the first and second tab engaging protrusions 70, 72 so that the panel medial portion 68 is disposable within the confines of the first and second retaining tabs 74, 76 in the assembled position shown in FIG. 5. To achieve this, the medial portion 68 is bowed to permit the first tab engaging protrusion 70 to abuttingly engage the first retaining tab 74 while the second tab engaging protrusion 72 abuttingly engages the second retaining tab 76. While the roof panel member 26 can be bowed manually prior to interlocking engagement with a contiguous roof panel member, by using an electromagnet or vacuum cup of conventional design to grip the upper surface of the roof panel member 26 so that a person on the roof can bow the panel without assistance from below, a convenient way to achieve the lateral flexing of the roof panel member 26 is depicted in FIG. 7A in which a protruding bowing tab 80 is integrally formed in the upper support surface 50 of the panel support beam 48 and is bent angularly upwardly to engage the underside of the panel medial portion 68. Once the first tab engaging protrusion 70 is abuttingly engaged with the first retaining tab 74, the installer's hand or foot is placed as shown at 82 while the installer's hand at 84 presses the medial panel portion 68 downwardly against the bowing tab 80, causing the panel flat to bow and the second tab engaging protrusion 72 to be against the upper support surface 50. As the installer's weight, via the foot 82, is brought to bear upon the medial panel portion 68, the bowing tab 80 is caused to be bent downwardly so as to flatten it flush with the rest of the upper support surface 50 as his medial panel portion 68 is brought to rest thereupon as shown in FIG. 7B this causes the second tab engaging protrusion 72 to slide sidewise to a position under and abuttingly engage the second retaining tab 76.

Once this is achieved, retaining struts 86 are placed across the medial panel portion 68 and are of an appropriate length to extend between the first and second tab engaging protrusions 70, 72 as shown in FIG. 7C at each location where the roof panel member 26 is supported by the underlying structure. Each retaining strut 86 can be a narrow strip of spring material that can be bowed for placement, or it may consist of a multiple piece, expandable member. As depicted in FIG. 6, the retaining strut 86 exerts a restraining force 88 to prevent further lateral bowing or flexing from occurring once the non-penetrating securement assembly is assembled and thus to prevent disengagement of the first and second tab engaging protrusions 70, 72 from the retainer tabs 74, 76 so that the medial panel portion 68 is firmly secured to the underlying structure. Of course, while the attachment of the panel flat has been described relative to the underlying panel support beam 48 of the panel support assembly 30, it will be appreciated that the retaining tabs 74, 76 can be supported directly by the underlying joists or purlins 22.

An alternative mechanism for providing the force 88 to retain the first and second tab engaging protrusions 70, 72 in abutting engagement with the retainer tabs 74, 76 is provided by the use of an adhesive, as shown in FIG. 8, which is a view similar to FIG. 6. That is, FIG. 8 shows an enlarged view depicting the profile of the second corrugation crown 66 with an amount of adhesive 90 placed between the underside of the medial panel portion 68 of the roof panel member 26 and the upper support surface 50 of the underlying panel support beam 48 near the first and second retainer tabs 74, 76; FIG. 8A is a further enlargement of that portion encircled in FIG. 8. The shearing adhesive forces of the adhesive 90 will provide the force 88 required for assembly maintenance and serves as replacement to the retaining strut 86. The underside 91 of the medial panel portion 68 can be roughened, such as shown in the enlarged view of this surface in FIG. 8A to effect better adhesion of the adhesive 90 and to provide a mechanical bond to resist lateral forces tending to pull the tab engaging protrusions 72, 74 from under the retaining tabs 74, 76. Preferably, the medial panel portion 68 has an embossed area 92 formed next to the juncture with the tab engaging protrusions 70, 72 so as to provide shoulder portions such as designated 94 which provide added gripping surface and places the plane of engagement between the adhesive 90 and shoulder portion 94 more in line with the line of curvature of the bowed panel when the panel is subjected to wind uplift. This places the adhesive 90 in shear rather than being torn apart and results in a much better bond which enables the edge of the adhesive 90 to resist separation at the edges of the adhesive areas when bowing force is imparted to the roof panel member 26. Also, release paper 93 can be placed under a portion of the adhesive 90 to permit the edge of the adhesive to lift freely from the upper support surface 50 so that the edge of the adhesive will conform to the bowed shape of the panel 26 as it is caused to be lifted by wind loading.

Preferably, the adhesive 90 will be a hot melt type which is prepositioned onto the under surface of the flat 68 of the roof panel member 26 or onto the top support surface 50 of the underlying panel support beams 48. Screws 95 can be secured through the adhesive 90 as shown, to mechanically anchor the adhesive to the panel support beams 48. Once the roof panel member 26 is secured to the retaining tabs 74, 76 as shown in FIG. 7B, the adhesive 90 can be caused to become surface molten via the application of heat and pressure, such as by using an appropriately shaped electrical resistance heater which is pressed against the upper surface of the roof panel member 26. If desired, the heater may be designed so the installer can place at least one of his feet hereon and transfer a portion of his weight on the heater during the adhesive melting step.

As mentioned above, the base clips 40 can be formed as an integral portion at one end of the panel support beams 48, and this is shown more clearly in FIG. 9 in which appears the panel support beams 48 and 48A. The panel support beams 48 and 48A are of similar construction, so only the overlapping ends are shown in FIG. 9. The panel support beam 48 is a channel shaped member having a central web portion 96 of which the web portion 41 of the base clip 40 is an integral extension thereof which has been formed to extend downwardly and substantially normal from the web portion 96. Also, the clip support member 52 can be formed as an integral portion of the panel support beam 48, such as shown by the clip support member 52A which is integrally formed as a portion of the panel support beam 48A. The web portion 96A extends past the end of the panel support beam 48A and is formed normal upwardly as shown. As shown, the distal end 98 of the clip support member 52A is formed to extend parallel to the web portion 96A. The end 98 forms a backup shelf for the male side lap joint as shown in FIGS. 1 and 3A to support this portion of the roof panel 26A as insertion into the female side lap joint of roof panel 26 is performed.

As depicted in FIG. 9, the end of the panel support beam 48A bearing the clip support member 52A is positioned to overlap the end of the panel support beam 48 from which the base clip 40 extends. Once overlapped, the panel support beams 48, 48A are both supported by the base clip 40 at the ends shown. Once the panel support beam 48 is secured in place on the underlying structure 22 via the bolts 44 through the leg portions 42, it is a simple matter to overlap the clip support bearing end of the panel support beam 48A thereover, secure these ends together via the screw 54 threadingly engaged through the aligning holes 97, 97A respectively in the panel support beams 48, 48A, and once the newly placed panel support beam 48A is so attached to the already positioned panel support beam 48, it becomes self standing since its other end is supported by its base clip (not shown) at the other end thereof which is now resting upon the underlying structure 22. Also, attachment of the clip support member to the panel support beam is unnecessary since it will now be in place.

In the assembled position the hole 97A is directly above the hole 97 and the screw 54 is inserted through both holes. This insures that the screw 52A is assembled at a specified distance from the screw 52 disposed at the distal end of the panel support beam 48 (not shown). The hole 97A is configured to be the same size as the outside diameter of the screw 54 and the hole 97 is configured to be smaller than the outside diameter of the screw 54 so that the threads of the screw 54 will bite into the sides of the hole 97 as the screw 54 is inserted so that the web portion 96 forms a nut. This enables force to be transferred between support beams 48 and 48A without slippage between them.

The leg portion 42 of the base clip 40 serves as a spring mechanism to allow the base clip 40 to move in a direction perpendicular to its assembled position as the panel 26A moves under the influence of environmental effects. The bolt or screw 44 is located a distance L1 from the base clip 40, or alternately it can be located at a selected distance L2, the value of L2 being determined by the amount of resistance to movement desired for the base clip 40. The proper value of L2 will be determined by the torsional strength and deflection characteristics of the leg portion 42 and the movement of the roof panel 6A as it expands and contracts under the effects of environmental influences.

Turning now to FIG. 10, illustrated therein is an alternate panel support assembly 100 which is an abbreviated version of the panel support assembly 30 previously described. The panel support assembly 100 comprises a panel support beam 102 that supports the first and second retaining tabs 74, 76 (which are preferably integral portions of the support beam) and extends beneath the medial panel portion 68 of the roof panel 26. However, the panels support assemlby 100 terminates such that its ends lay below first and second corrugation crowns 64, 66. A pair of fastener bolts 104 extend through apertures in and attach the panel support beam 102 to the underlying building structure, which is shown as a purlin 22A in FIGS. 10 and 10A. Each of the fastener bolts 104 has a threaded first end 106, a body portion 108 and a bolt head second end 110. A shoulder is formed between the first end 106 and the body portion 108. The threaded first end 106 is a self-drilling-/self-tapping bit that threadingly engages the purlin 22A as the bolt head 110 is turned, and once the threaded first end 106 is fully into the purlin 22A, its shoulder engages the top surface of the purlin 22A and supports the panel support beam 102 at a distance above the purlin 22A determined by the length of the body portion 108. Preferably, each fastener bolt 104 extends through a fastener retention slot 112 (one of which is shown in FIG. 10B) in the web portion of the panel support beam 102, which allows a degree of floating of the panel support beam 102 relative to the purlin 22A to accommodate thermal expansion of the roof panel 26.

As shown in FIG. 10A, the insulation 36 is disposed over the purlin 22A, and a rigid insulation board 114 of conventional foamed insulation material is placed thereover. The panel support beam 102 is a channel shaped member and its web portion rests upon the insulation board 114; also, and the fastener bolts 104 extend through the insulation board 114 and the insulation 36, which is compressed over the panel 22A as shown when the fastener bolts 104 are tightened to place the panel support beam in its assembled position. The insulation board 114 compensates for the compression of the insulation material 36.

As an alternate to the bolts 104 as means for supporting the panel support beam 102, other fastener assemblies such as taught by my U.S. Pat. No. 4,329,823, "Support Spacer Apparatus", may be used. That is, it is within the contemplation of the present invention that the panel support beam 102 be supported a predetermined distance above the underlying building structure in the manner taught by this previous patent of mine, and that such fastener assemblies may be caused to be laterally moveable relative to the panel support beams 102 as is the case with the bolts 104 in the fastener retention slots 112. This permits a degree of movement of the panel support beam 102 and the supported roof panel 26 relative to the fasteners 104, thus accommodating roof expansion and contraction effected by environmental influences.

As shown in FIG. 10, a clip support member 116 is attached directly to the purlin 22A via a bolt 118 through an aperture in the lower flange end 120 thereof. The clip support member 116 is of sufficient length to extend upwardly from the purlin 22A so as to support the male side lap joint of the roof panel 26B via the end portion 122 thereof. The hold down clip 56 attaches via the bolt 57 to the upper portion of the clip support member 116 in the manner and for the function described above to engage the interlocking side lap joints in the assembled position of the roof panels 26 and 26B.

Once the panel support beam 102 is in its proper position as shown in FIG. 10, the medial panel portion 68 is supported thereon in the manner described hereinabove for the panel support beam 48, with the first and second tab engaging protrusions 70, 72 being abuttingly retained by the first and second retaining tabs 74, 76 and the retaining strut 86. It will be understood that similar clip support members 116 are disposed along the purlin 22A for each of the overlapping side lap joints of the contiguous roof panels, and that similarly disposed panel support beams 102 are positioned along the purlin 22A, as well as the other purlins of the underlying building structure, to support medial panel portions of each of the roof panels.

The descriptions provided above for various components of the present invention have considered the roof panel 26 as having conventional side lap joint portions. Turning now to FIG. 11, depicted therein is an improved interlocking side lap joint assembly 130, shown in partial cross-sectional, elevational view and which is a female/male interlock seam assembly formed by the interlocking engagement of contiguously placed roof panels 132A and 132B. The roof panel 132A has a female side lap joint 134 formed along one side thereof, the female side lap joint 134 having a first leg portion 136 and a second leg portion 138 extending therefrom and forming an insertion cavity 140 therebetween. A mastic cavity portion 142 is formed at the apex juncture of the first leg portion 136 and the second leg portion 138, the mastic cavity portion 142 having communication with the insertion cavity 140.

Along the opposing side (not shown) of the roof panel 132A there is formed a mating male side lap joint which is identical in construction to that shown in FIG. 11 as male side lap joint 144, it being understood that the female side lap joint along one side of the roof panel 132A being matingly interlocked with the male side lap joint of the contiguously placed roof panel 130B. Accordingly, a description of the male side lap joint 144 in relation to the roof panel 132B will be as well a description of the male side lap joint disposed along the opposing side of the roof panel 132A. Further, it will be understood that the panel 132A has a medial panel portion (not shown) as previously described for the roof panel 26, and as shown in FIG. 11, the first leg portion 136 of the female side lap joint 134 extends substantially normal (at about a 90 degree angle) to said medial panel portion. Also, the male side lap joint 144 has a first leg portion 146 that extends substantially normal to the medial panel flat portion (not shown) of the roof panel 132B, and a second leg portion 148 extends angularly from the first leg portion 146 and forms an apex portion 150 at the juncture of the first and second leg portions 146, 148. As will be discussed below, the apex portion 150 is formed for entry into the upper mastic cavity portion 142 when the male side lap joint 44 is inserted into the insertion cavity 140 of the female side lap joint 134.

Returning to the female side lap joint 134, it will be noted that the second leg portion 138 extends normally to the first leg portion 136 to provide an upper flat portion 152 to the female side lap joint 134; also, another downwardly extending portion 154 and an inwardly extending portion 156 are provided, with the latter portion 156 forming a shoulder stop portion 158. The second leg portion 138 has an edge engaging ramp portion 160 which extends generally toward the first leg portion 136 and partially blocks the opening to the insertion cavity 140. Further, it will be noted that the second leg portion 148 of the male side lap joint 144 has a shoulder engaging portion 162 shaped to nest against the shoulder stop 158, and the end of the second leg portion 148 defines a ramp engaging edge 164.

When assembled, the female side lap joint 134 of the roof panel 132A is positioned over the male side lap joint 144 which has been previously positioned to rest upon the several clip support members 52 along the side of the roof panel 132B, and supported by the upper portions 98 thereof, which serve to backup the flexible sheet metal of the male side lap joint 144. As the male side lap joint 144 is caused to enter the insertion cavity 140, the first leg portion 146 of the male side lap joint 144 is disposed substantially parallel to the first leg portion 36 of the female side lap joint 134; and the second leg portion 138 of the female side lap joint 134 is caused to flex open as the ramp engaging edge 164 presses against the edge engaging ramp 160, causing the mouth of the insertion cavity 140 to enlarge to receive the male side lap joint 144. As the male side lap member 144 is caused to be received into the insertion cavity 140, the apex portion 150 of the male side lap joint 144 is projected into the mastic cavity 142, which is partially filled with a first mastic material 166, such as a bituminous material. As this is occurring, the ramp engaging edge 164 is sliding along the edge engaging ramp 160 and finally, the shoulder engaging portion 162 is brought into abutting engagement with the shoulder stop 158. The dimensions of the second leg portion 138 and the second leg portion 148 are predetermined such that the shoulder engaging portion 162 is in abutting engagement with the shoulder stop 158 when the ramp engaging edge 164 is at or near the center of the edge engaging ramp 160. The ramp engaging edge 164 and the edge engaging ramp 160 are positioned so that at least one edge of ramp engaging edge 164 bites into edge engaging ramp 160 as environmental forces tend to disengage the two. Further, the edge engaging ramp 160 may be provided a knurled top surface 168 so as to resist disengaging movement of the ramp engaging edge 164 and ramp engaging edge 164 may be sharpened to bite into the edge engaging ramp 160. Once assembled, the second leg portion 138 and the second leg portion 148 return to substantially their nonflexed positions after the male side lap joint 144 is matingly received within the insertion cavity 140 of the female side lap joint 134. Configuring the second leg portion 148 so that theoretically it is fully engaged with the second leg portion 138 when the ramp engaging edge 164 is at or near the mid point of the edge engaging ramp 160 allows the male side lap joint 144 and the second leg portion 138 to be fully engaged and locked together even though minor manufacturing imperfections cause some deviation from theoretical and locking can occur above or below the mid point.

The above described arrangement provides a standing seam assembly whereby the apex 150 of the male side lap joint 144 is caused to penetrate the mastic cavity 142 and to reside therein at a position determined by the locking engagement of the shoulder engaging portion 162 and ramp engaging edge 164 of the second leg portion 138 between the shoulder stop 158 and the upper portion of the edge engaging ramp 160, respectively. This locking engagement prevents relative movement between the female side lap joint 134 and the male side lap joint 144, preventing fretting of the first mastic material 166 with the movement that occurs because of thermal expansion and contraction or roof loading that occurs to the roof panels 132A and 132B.

As discussed hereinabove, a plurality of hold down clips 56 are supported by the underlying building structure and disposed to interlock over the apex portions of the male side lap joints in order to connect the standing seam assembly to the building structure. Such hold down clip members 56 are usually hooking members of about three to four inches in length. Accordingly, the female/male interlock seam assembly 130 must accommodate the intrusion of such clips at every bar joist or purlin intersection. Shown in FIG. 11 is one such location as the upper portion 58 of the hold down clip 56 is hooked over the apex 150 of the male side lap joint 144. The placement of such hold down clips 56 is performed prior to interlocking the female and male side lap joints 144, 134, and as insertion is completed, the upper portion 58 is caused to project into the mastic cavity 142 and thus into sealing engagement with the first mastic material 166.

As further insurance against this disengagement of the assembled female and male side lap joints 134, 144, the end portion 170 of the upper portion 58 is disposed to come into near proximity to a knurled clip retention surface 172 on the inwardly extending portion 156 of the second leg portion 138 of the female side lap joint 134. By "near proximity" it is intended herein to denote that the several elements under consideration in the assembled position are dimensionally predetermined such that the end portion 170 is caused to be brought into close proximity (that is, either directly abutting or clearing same by a very small gap) so that the end of end portion 170 will bite into the surface 172 as uplift forces tend to separate one panel from the other. During insertion, the opening action of the second leg portion 138 of the female side lap joint 134 relative to the first leg portion 136 has permitted entry of the male side lap joint 144 with its accompanying hold down clip member 56; however, once the portions of the female and male side lap joints 134, 144 are relaxed in the assembled position thereof, any force tending to cause separation of these two joints will cause the end portion 170 to be brought into engagement with the clip retention surface 172, thereupon providing another force that resists disengagement of the female and male side lap joints 134, 144. An encapsulating seal 174 is disposed in the inner cavity of the hooking portion 58 which encapsulates the apex 150 in the assembled position to provide a positive seal between the upper portion 58 and the apex 150 of the male side lap joint 144.

The top of the female/male interlock seam assembly 130 is believed unique in that the mastic cavity portion 142 is relatively large as compared to prior art mastic cavities and prior art standing seam assembly joints. Further, the final assembled position of the apex 150 (and its accompanying clip portion 58) within the mastic cavity 142 is offset from the center of the mastic cavity 142 so that screw attachment of a flashing sheet 176 is possible where required, such at roof or gutter edges. The sheet metal flashing sheet 176 can be supported on the upper flat portion 152 of the female side lap joint 134, and a conventional sheet metal screw 178 can be used to secure it thereto. Sufficient space is provided in the mastic cavity 142 that, together with the offsetting of the apex 150, the screw 178 can penetrate the top of the female side lap joint 134 without risk of penetrating the apex 150 or the clip portion 58. Further, a locator groove 180 can be provided in the upper flat portion 152 as an aid in positioning and guiding the screw 178, and a mastic bead 181 can be placed on the underside of the flashing sheet 176 so as to be sealingly adhered to the upper flat portion 152 when secured thereto.

Another feature of the mastic cavity 142 is the provision of a second mastic material 182 within the mastic cavity 142 under the locator groove 180 so as to contact and seal about the penetrating screw 178. The difficulty with most prior art standing seam joint assemblies is that hydraulic pressures are generated on the mastic during joint assembly as the mastic is being penetrated by the male side lap joint, which often causes joint opening, especially at the clip attachment points. In prior art joints, if the mastic is caused to fill the entire mastic cavity, hydraulic pressure is built up with the insertion of the male joint member. That is, the displacement of the mastic in such prior art joints, especially at lower ambient temperatures at which the mastic becomes viscous, can and often does force the female and male side lap joints to separate. On the other hand, if the mastic cavity in prior art joints is left partially vacant, the movement of the male joint member in the mastic cavity caused by environmental influences causes the mastic to be worked out of the joint with the fretting action of the male joint member. In the present invention, the provision of a second mastic, namely a highly compressible mastic such as one of the foam variety, permits the flowing first mastic material 166 a place in which to expand while maintaining the seal that must be effectuated within the mastic cavity 142. Of course, it will be possible in some applications to simply omit the second mastic material 182 and leave this portion of the mastic cavity 142 vacant, which still provides for the expansion and displacement of the first mastic material 166.

In addition to the nonfretting feature of the female/male interlock seam assembly 130 discussed above with regard to the mastic material, the positive interlocking feature of the female/male interlock seam assembly 130 offers important advantages with regard to resisting joint separation, sometimes referred to as "unzipping" which results from rotational forces imposed on the joint by windlift on the medial portions of the panels. Of course, the non-penetrating attaching assembly of the present invention provides for anchoring of the medial panel portions 68 of the roof panels 26 to the underlying building structure, and this prevents most of the rotational movement imparted to the joints, but when the nonpenetrating attaching assembly is not used, or even when it is used, there will still be uplift on some portions of the roof panels, the result of which is to place some, if not a good deal, of rotational moment on portions of the female/male interlock seam assembly 130.

The interlocking feature of the dual point gripping function of the shoulder stop 158 and the edge engaging ramp 160 abuttingly engaging the shoulder engaging portion 162 and the ramp engaging edge 164, respectively, serves to resist moment forces of disengagement imposed by relative rotation of the roof panels 132A and 132B. Further, the interaction of the end portion 170 (of the hold down clip member 56) with the clip retention surface 172 also helps resist rotational forces.

It has been observed that the height and the width ratio of the female/male interlock seam assembly 130 is also important. For the purpose of unzipping considerations, the distance indicated by the arrow 190 will be referred to as the height (H) of the female/male interlock seam assembly 130, and the distance indicated by the arrow 192 will be referred to as the width (W) of the female/male interlock seam assembly 130. It will be appreciated that these distances measured from the point of upward rotation (that is, from the point of contact of the ramp engaging edge 164 with the edge engaging ramp 160), represent the moment arms applied during rotation that spring the leg portions of the female and male side lap joints 134, 144 apart. Practical observations have indicated that the ratio (R) of H to W has a direct bearing on the ability of the joint to transfer force from the clip to the panel and from one panel to the other. As a result the unzipping characteristics of the female/male interlock seam assembly 130 are greatly improved. If R is less than about 1.0, and for values up to about 1.0 (that is, low and wide joints), there is more of a tendency for the joint to separate as the roof panel 132A is rotated relative to the roof panel 132B. For values of R greater than about 1.0 (that is, for high, narrow joints), the tendency to unlock during rotational moment load is decreased. At a value of R of approximately 2.0 very good locking stability was observed during tests to separate the roof panels 132A, 132B.

Turning now to FIGS. 12 through 15, shown therein is the improved joint assembly of the present invention. It is conventional practice to overlap the ends of roof panels, which in general, creates difficulties in properly sealing overlapping roof panel ends, especially at the "four corner area" where the standing seam joints overlap. At the four corner area it is the usual practice to notch the seams to avoid interference, and this provides even greater difficulties in sealing four overlapping roof panels.

In the present invention, the butting ends of the roof panels are not overlapped, and only minimal notching is required at the overlapping seam portions. FIG. 12 is a plan view of the four corner area of the previously described roof panels 26, 26A and the butting roof panels 26C and 26D which are of similar construction. A gap 200 is left between the end butting roof panels 26A and 26D and between roof panels 26 and 26C. As shown in FIG. 13, this gap 200 is filled with mastic 202 which is not shown in FIG. 12 for clarity. A series of cinch straps 204, 204A conforming to the profile of the abutting roof panels 26, 26A and 26C, 26D, are tightly secured over the gap 200 and mastic 202 to form a watertight seal thereat. The ends of the roof panels 26, 26A and 26C, 26D are shown supported on the panel support beams 48, 48A. The cinch straps 204, has an overlapping end 206A overlapping the female side lap joint portion 62A, and the cinch strap 204 has an upstanding end 208. The cinch strap ends 206A and 208 are disposed on either side of the interlocked standing seam joint and self-drilling, self-tapping bolts 210 are threadingly engaged therewith, through the joint. Alternately to achieve greater field efficiency and more product assembly accurracy the cinch straps 204 and panel 26 may be factory punched so that mating holes are achieved when properly assembled in the field. Self tapping fasteners are then used to complete the end joint.

Figure 14:
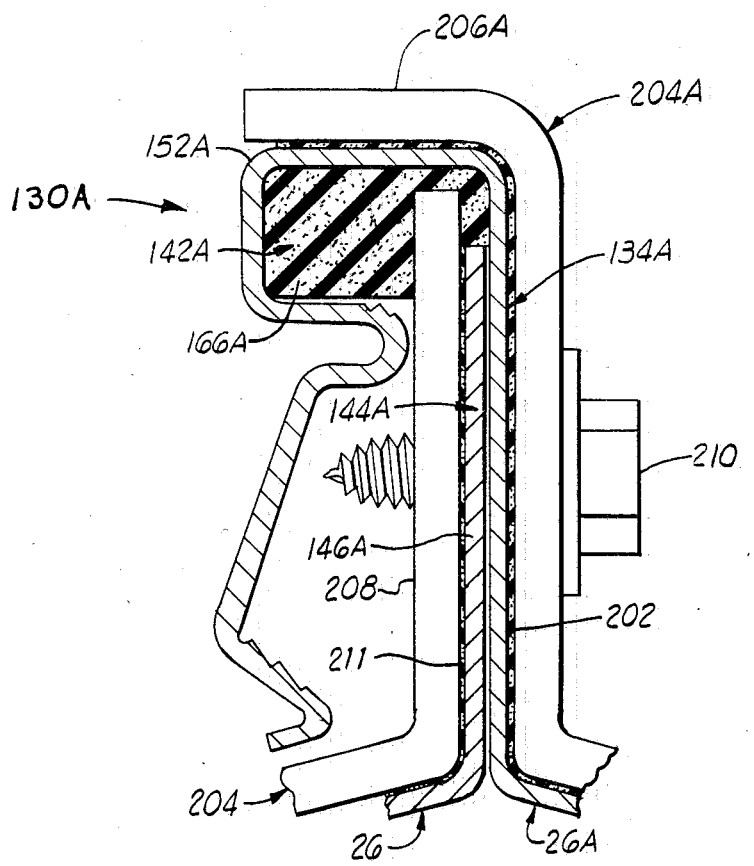
FIG. 14 is an elevational view taken at 14—14 in FIG. 12.

FIG. 13 an elevational view taken at 13—13 in FIG. 12, shows the overlapping end 206A of the cinch strap 204A with the elastomeric mastic 202 disposed between the cinch strap and the underlying roof panels 26A and 26D. FIG. 14, an elevational view of the standing seam joint taken at 14—14 in FIG. 12, shows the interlock seam assembly 130A, similar to the seam assembly 130 previously described. The overlapping end 206A overlaps the upper flat portion 152A of the female side lap joint 134A, and the upstanding end 208 is disposed adjacent to the first leg portion 146A of the male side lap joint 144A, the second leg portion having been notched away to permit the upper end of the upstanding end 208 and mastic 211 to extend into the mastic cavity portion 142A in which a mastic 166A is disposed. While only one mastic is shown in FIG. 14, it will be understood that a second mastic like previously described mastic 182 can be provided as well. The mastic 202 is also shown in FIG. 14, and further mastic 211 is provided between the cinch strap 204 and the roof panel 26.

Figure 15:
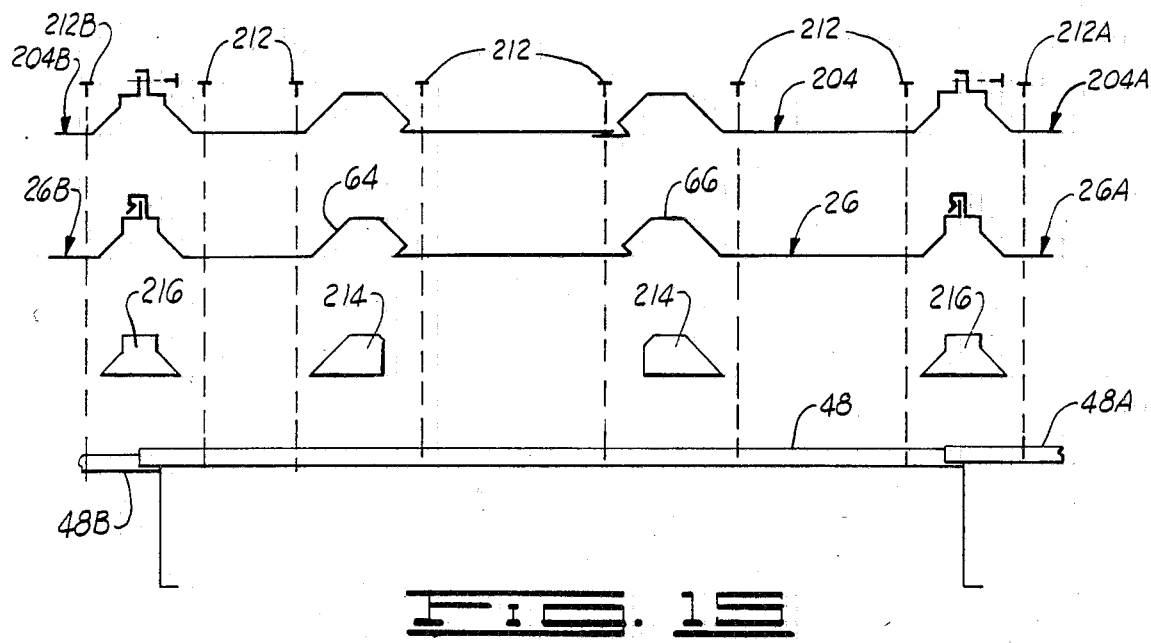
FIG. 15 is a semi-detailed schematic representation of the joint assembly of the present invention in exploded view.

FIG. 15 is a semi-detailed schematic representation of the joint assembly in exploded view to show the profile of the various components thereof. Shown therein are the interconnected panel support beams 48, 48A and 48B which support the standing seam roof panels 26, 26A and 26B. The cinch strap 204 is a relatively narrow, metal strap (approximately 4 inches in width) which has a profile that follows that of the underlying roof panel 26, and a plurality of self-drilling, self-tapping screws 212 are driven through the cinch strap 204 and secured to the panel support beam 48, and screws 212A and 212B serve in like fashion to attach the cinch straps 204A and 204B and roof panels 26A and 26B to the underlying panel support beams 48A and 48B respectively. Of course, as described previously, mastic is disposed between the cinch straps and the roof panels, which serves to provide a continuous seal over the entire butt joint, including the four corner area discussed above.

As shown in FIG. 15, a pair of blocking plugs 214 are provided to fill the corrugation crowns 64 and 66, and similarly, blocking plugs 216 are provided to fill under the standing seam joints at the interlocking sides of the roof panels 26, 26A and 26B. These blocking plugs are preferably composed of an elastomeric material, such as a hard rubber, and are preferably about 3 inches in width, sufficient to underlie the gap 200 between abutting roof panels 26, 26C and 26A, 26D.

The present invention also provides a cutting tool which can cut expanded insulation to minimize compression of such insulation near the clip fasteners which serve to support the panel support beams. In FIG. 16 there is shown compressible insulation 36A similar to the insulation 36 previously described. As shown, the flexible membrane 32A is supported over the underlying Z purlin secondary structural system 20A which in turn is supported by the primary structural system 14A. A manually actuated cutter 220 has a hollow, box shaped cutter blade 222 with a handle 224 attached thereto. As shown in FIGS. 17 and 18, the cutter 220 is pressed (via hand action by a worker, not shown) into the insulation and against the underlying Z purlin 20A, and removed therefrom, an insulation plug 226 can be lifted from the insulation blanket 36A. This permits the attachment of the base clip 40 via the screws 44. Following this attachment, the insulation plug can be replaced about the base clip 40. This provides clip attachment with minimum disruption of the insulation blanket 36A.

FIG. 19, a cross sectional view taken at 19—19 in FIG. 16, shows the sharpened edges 226. A plurality of stand off spikes 228 serve to hold the edges off of the flexible membrane 32A during the cutting action to maintain the integrity of the membrane.

The Z purlins shown in FIGS. 16 through 19 are of improved design and are part of the present invention. Shown therein is the joint formed by the overlapping of a first Z purlin 230 and a second Z purlin 232. A backup plate 234 is bolted to this overlapping joint via bolts 236. A steel spacer 238 is disposed between the lower flanges, and bolts 240 secure the purlin to the primary structure 14A. The configuration of the Z purlins 230, 232 are designed to prevent structural failure caused by rotation or translation of the purlins, as discussed below.

Shown in FIG. 20 is a Z purlin 250 of conventional profile. Conventional purlins are composed of parallel top and bottom flanges 252, 254 connected by a web 256 that is substantially perpendicular to these flanges. The flanges 252 and 254 have stiffening elements 258 and 260, respectively, extending from the outer-most edges at an oblique angle (which allows the plurlins to nest well).

It is known that Z purlins are subjected to a number of loads including inwardly and outwardly directed live load, dead load, and axial load. Conventional Z purlins are subjected to premature failure by rotation and translation and by web buckling when subjected to inwardly or outwardly directed loads such as snow or wind. Z purlins are placed on frames with the top flanges pointing upslope and the compression flanges stiffened so that they remain straight throughout their length; consequently, such Z purlins tend to fail in a predictable manner as for example when a conventional purlin on a 1 to 12 slope building is stiffened by connecting it directly to a stiff metal roof system and then subjecting it to inwardly directed load tends to roll upslope, and unless concurrently subjected to a restraining force, will lay over and fail at a reduced load.

An applied vertical load such as one producing bending in a Z purlin supported at its ends by primary frames resolves into components along the U and V axes and produces deflection along each axis unless the Z is constrained to deflect only in the plane of the applied load as would be the situation when it is tightly connected to a stiff roof systems. If not constrained, any lateral deflection will produce twisting as the vertical load G-10, moving with the deflecting purlin, is no longer in the plane of the end reactions. The end reactions being those reactions that occur near the end of the purlin beam as it is supported by the primary frame. Thus a Z purlin such as the Z purlin 250 depicted in FIG. 20, unbraced or not stiffened laterally between the ends and loaded in the plane of the web, deflects lateraly and twists. These secondary effects must be adequately controlled to develop the full load capacity of the purlin. In actual metal building roofs, the degree of constraint depends on the rotational and lateral stiffness of the fastening system, the stiffness and strength of the roof and any special bracing members present. If a combination of these three elements acts such that the only deformation that occurs is the simple deflection of the purlin in the plane of the applied load, the bending action will be constrained bending and the load capacity of the purlin will be enhanced.

In prior art usage a conventional Z purlin has been kept straight throughout its length by connecting it directly to the stiff roof system and the tendency of the purlin to rotate in the direction the compression flange points has been offset by the downslope component of the gravity load being applied from the roof. These two forces are normally offset when a typical purlin is combined with a roof having a slope of about 4 to 12. On lower slopes, using conventional purlins, the tendency to translate and rotate remains the same; however, the downslope component of the gravity roof load decreases as the roof slope decreases so that at lower slopes the gravity load no longer produces sufficient counteracting forces along the weak vertical (V) axes, and unless the purlin is constrained by other forces, it will fail prematurely.

In prior art usage, the top or compression flange of a conventional Z purlin, when subjected to inwardly directed live load, has been attached to a relative stiff roof panel so that the top flange remained straight throughout its length. Prior art roof panels were typically fastened to the Z purlins by self-drilling sheet metal screws. These fasteners generally provided restraint to the purlin. However, the further the roof panel was separated from the underlying purlin by insulation and such other material, the less the resistance to rotation and translation provided the Z purlin by the roof panel. The reason for this is that the roof panel is separated from the underlying purlin by a thickness of insulation, allowing the fastener to rotate as the purlin moves laterally. Even more recently, roofs have begun to be attached to the underlying Z purlin by the use of a sliding clip. The sliding clip allows the roof to move in relation to the underlying purlin and while this eliminates many of the problems encountered because of the different degrees of expansion and contraction between the roof and its underlying secondary structural system, the roof now provides little or no lateral support to the purlin. As a consequence, other means of stabilizing the purlin must be adopted.

In the prior art, a uniform load G-1D (downward) is offset by two loads of ½ the magnitude of G-1D, G-1U (upward) occurring at the end of the purlin beam. However, between primary support points this allows the purlin to translate and rotate and reduces its load capacity. The web can be constrained by applying counteracting force H-1 and H-2. In past usage, when the roof system was connected directly to the purlin, H-1 was supplied by restraining the roof panel and then connecting the top of the purlin to the roof panel, and H-2 was supplied by connecting it to the primary frame. However, doing this results in several deficiencies. In order to obtain a good connection between the roof panel and purlin the insulation normally placed between the two must be eliminated or severely compressed, both of which lead to undesirable results. Doing this also causes leaks because the forces of expansion and contraction are not dissipated adequately. Because the force H-1 is applied more or less throughout the length of the purlin and H-2 can only be applied at end points, there is a tendency to twist the purlin lengthwise as the restraining forces are applied.

In the present invention the web of the purlin is formed at an acute angle to the flange and the reinforcing lip is formed in such a manner that it still allows the purlins to nest. This enables the purlins to be nested for shipment which is a real advantage. To say this another way, as shown in FIG. 21, angle $\beta$ is always greater than angle $\alpha$ in the Z purlin 230 illustrated schematically. The restraining force to prevent the Z purlin 230 from rolling over is obtained by forming the flange 270 and web 272 at an acute angle to the web. This causes the force G-11 and G-21 to form a moment couple to counteract the normal roll over forces exerted on a Z purlin; these latter mentioned forces are designated H-31 and H-41 in FIG. 21. Further, this configuration provides a restraining force to prevent rotation throughout the length of the purlin. When the Z purlin is restrained against the translation by the teaching of my previous patent application, U.S. patent application No. 306,662 filed Sept. 29, 1981, the Z purlin taught herein will be stabilized for maximum stress control.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

I claim:

1. In a standing seam roof assembly in which roof panels are supported by underlying structure in side by side contiguous relationship with interlocking side lap joint portions, an improved female/male interlock seam assembly formed by the interlocking engagement of contiguous roof panels wherein each roof panel comprises:

a first female side lap joint along one side of the roof panel having a first leg portion extending substantially normal to the medial panel portion and a second leg portion angularly extensive from the first leg portion and forming an insertion cavity therebetween, an upper portion of the insertion cavity providing a mastic cavity portion, the second leg portion forming a shoulder stop in the medial portion thereof and forming an edge engaging ramp portion extending generally toward the first leg portion to partially block the opening of the insertion cavity; and a second male side lap joint along the other side of the roof panel and having a first leg portion extending substantially normal to the medial panel portion and a second leg portion angularly extensive from the first leg portion and forming a male apex portion at the junction of the first and second leg portions, the end of the second leg portion defining a ramp engaging edge and having a shoulder engaging portion formed therein at a predetermined distance from said ramp engaging edge, the second male side lap joint matingly receivable by a female side lap joint of identical construction to the first female side lap joint formed along the side of a contiguously disposed roof panel, the second male side lap joint insertable into the insertion cavity of said contiguous first female side lap joint so that the male apex extends into the mastic cavity portion, the first leg portion of the second male side lap joint being substantially parallel to the first leg porion of the female side lap joint, in the assembled position, and the shoulder engaging portion and the ramp engaging edge of the second leg portion of the second male side lap joint abuttingly engaging respectively the shoulder stop portion and the edge engaging ramp of the female side lap joint to which it is interlocked so that the male apex of the second male side lap joint is fixedly secured thereby at a predetermined position within the mastic cavity portion.

2. The standing seam roof assembly of claim 1 further comprising:
   clip means for connecting the first and second side lap joints to underlying structure and including a hold down clip member having an upper portion shaped to hook over the apex of the second male side lap joint.

3. The standing seam roof assembly of claim 2 wherein the shoulder stop of the first female side lap joint has a clip retention surface and whereby the end of the hold down clip member at the upper portion thereof is disposed in near proximity the clip retention surface of the female side lap joint when hooked over the apex of the second male side lap joint interlocked therewith.

4. The standing seam roof assembly of claim 3 wherein the edge engaging ramp of the first leg portion of the first female side lap joint has a knurled surface that resists disengaging movement of the ramp engaging edge of an interlocked male side lap joint.

5. The standing seam roof assembly of claim 4 further comprising:
   non-penetrating attaching means for connecting the medial portion of the roof panel to underlying structure, comprising:
      a first corrugation crown formed in the roof panel and disposed along one side of the medial panel portion;
      a second corrugation crown formed in the panel and disposed along the other side of the medial panel portion, each of the first and second corrugation crowns having a tab engaging protrusion form at the juncture of the corrugation crown and the medial panel portion;
      a pair of spaced apart retaining tabs supported beneath the roof panel by the underlying structure and extending angularly upwardly and each such retaining tab disposed to receive the tab engaging protrusion of one of the first and second corrugation crowns so that the tab engaging protrusions are forced into abutting engagement with the retaining tabs by selective lateral flexing of the roof panel; and
      retaining means for preventing disengagement of the tab engaging protrusions and the retaining tabs to maintain securement of the panel flat to the underlying structure in the assembled position.

6. The standing seam roof assembly of claim 5 further comprising:
   panel support means for supporting the roof panel at a predetermined distance above the underlying structure; and
   insulation means disposed beneath the panel support means for insulating the building structure from thermal energy loss through the roof panels.

7. The standing seam roof assembly of claim 6 wherein the clip means comprises:
   a hold down clip support member supported by the panel support means, the hold down clip member having a lower planar portion supporting the upper portion and having an aperture therethrough; and
   bolt means extending through the aperture for pivotally connecting the hold down clip member to the clip support member.

8. The standing seam roof assembly of claim 7 wherein the panel support means comprises:
   at least one panel support beam having an upper support surface supporting the retaining tabs and supporting the medial panel portion of the roof panel in the assembled position; and
   at least one base clip attachable to the building structure and supporting the panel support beam.

9. The standing seam roof assembly of claim 8 wherein the panel support beam is a channel shaped member having a web portion and wherein the base clip is formed as an integral portion of the web portion, the base clip being press formed to extend downwardly from the panel support beam at one end thereof, and wherein the distal end of the panel support member is shaped to overlap the base clip end of another panel support beam in end alignment therewith and is partially supported by said base clip end of the other panel support beam.

10. The standing seam roof assembly of claim 9 wherein the clip support member of the clip means is formed as an integral portion of the web portion of the panel support member at the distal end from the base clip portion thereof.

11. The standing seam roof assembly of claim 10 wherein the retaining means comprises:
   at least one retaining strut disposed to extend between the tab engaging protrusions above the retaining tabs to strengthen the panel flat from lateral flexing in the assembled position.

12. The standing seam roof assembly of claim 10 wherein the retaining means comprises:
   adhesive means disposed beneath and adhering to the underside of the roof panel and adhering to the upper support surface of the panel support beam for preventing lateral flexing of the medial panel portion in the assembled position.

13. The standing seam roof assembly of claim 12 wherein the panel flat of the roof panel is embossed to form a shoulder portion at the edge of the adhesive means to resist edge separation thereof.

14. A standing seam roof assembly for a building structure in which side lap joint portions disposed along the sides of a roof panel interlock with side lap portions of contiguous roof panels, the roof panel having a medial panel portion, comprising:
   a first corrugation crown formed in the roof panel and disposed along one side of the medial panel portion;
   a second corrugation crown formed in the panel and disposed along the other side of the medial panel portion, each of the first and second corrugation crowns having a tab engaging protrusion formed at the juncture of the corrugation crown and the medial panel portion;

panel support means supported by the underlying building structure for supporting the roof panel at a predetermined distance from the underlying structure;

a pair of spaced apart retaining tabs supported by the panel support means beneath the roof panel and extending angularly upwardly, each such retaining tab disposed to receive the tab engaging protrusion of one of the first and second corrugation crowns so that the tab engaging protrusions are forced into abutting engagement with the retaining tabs by selective lateral flexing of the roof panel;

retaining means for preventing disengagement of the tab engaging protrusions and the retaining tabs to maintain securement of the medial panel portion to the panel support means in the assembled position;

insulation means disposed beneath the panel support means for thermally insulating the building structure; and clip means supported by the panel support means engaging with the interlocking side lap joints for connecting the side lap joints to the panel support means, the clip means comprising:
 a clip member supported by the panel support means;
 a hold down clip member having an upper portion shaped to hook over the male side lap joint portion of the roof panel, the hold down clip member having a planar portion with an aperture therethrough; and
 bolt means extending through the aperture in the hold down clip member for pivotally securing the standoff clip member to the clip support member.

15. The standing seam roof assembly of claim 14 wherein the panel support means comprises:
 at least one panel support beam having an upper support surface supporting the retaining tabs and supporting the medial panel portion of the roof panel in the assembled position; and
 at least one base clip attachable to the building structure and supporting the panel support beam.

16. The standing seam roof assembly of claim 15 wherein the panel support beam is a channel shaped member having a web portion and wherein the base clip is formed as an integral portion of the web portion, the base clip being press formed to extend downwardly from the panel support beam at one end thereof, and wherein the distal end of the panel support member is shaped to overlap the base clip end of another panel support beam in end alignment therewith and is partially supported by said base clip end of the other panel support beam.

17. The standing seam roof assembly of claim 16 wherein the clip support member of the clip means is formed as an integral portion of the web portion of the panel support member at the distal end from the base clip portion thereof.

18. The standing seam roof assembly of claim 17 wherein the retaining means comprises:
 at least one retaining strut disposed to extend between the tab engaging protrusions above the panel to strengthen the medial panel portion from lateral flexing in the assembled position.

19. The standing seam roof assembly of claim 17 wherein the retaining means comprises:
 adhesive means disposed beneath and adhering to the underside of the roof panel and adhering to the upper support surface of the panel support beam for preventing lateral flexing of the medial panel portion in the assembled position.

20. The standing seam roof assembly of claim 19 wherein the medial panel portion of the roof panel is embossed to form a shoulder portion at the edge of the adhesive means to resist edge separation thereof.

21. A standing seam roof assembly for a building structure in which side lap joint portions disposed along the sides of a roof panel interlock with side lap portions of contiguous roof panels, the roof panel having a medial panel portion, comprising:
 a first corrugation crown formed in the panel and disposed along the other side of the medial panel portion;
 a second corrugation crown formed in the panel and disposed along the other side of the medial panel portion, each of the first and second corrugation crowns having a tab engaging protrusion formed at the juncture of the corrugation crown and the medial panel portion;
 panel support means supported by the underlying building structure for supporting the roof panel at a predetermined distance from the underlying structure, the panel support means comprising:
  a channel shaped panel support beam having a web portion with an upper support surface supporting the medial panel portion of the roof panel in the assembled position, the panel support beam having a fastener retention slot at each end thereof; and
  fastener means for attaching the panel support beam to the underlying building structure;
 a pair of spaced apart retaining tabs integrally formed as portions of the web portion of the panel support beam and extending angularly upwardly, each such retaining tab disposed to receive the tab engaging protrusion of one of the first and second corrugation crowns so that the tab engaging protrusions are forced into abutting engagement with the retaining tabs by selective lateral flexing of the roof panel;
 retaining means for preventing disengagement of the tab engaging protrusions and the retaining tabs to maintain securement of the medial panel portion to the underlying structure in the assembled position; and
 insulation means disposed beneath the panel support means for thermally insulating the building structure, the insulation means comprising:
  compressible insulation material supported by a flexible facing membrane stretched substantially tautly over the underlying building structure; and
  a rigid insulation board disposed over the compressible material which is compressed thereby over the underlying building structure, the panel support beam disposed over the rigid insulation; and
 wherein the fastener means comprises:
  at least a pair of fastener bolts each of which having a threaded first end, a body portion and a headed second end, the first end threadingly engageable with the underlying building structure for securement thereto, each of the body portions of the fastener bolts extendable through one of the fasteneer retention slots and extendable through the rigid insulation board and the compressed underlying insulation material so that the panel support beam is pressed over the rigid insulation board in the assembled position; and wherein the standing seam roof assembly further comprises:

clip means for connecting the side lap joints to the panel support means, the clip means comprising:

a clip support member supported by the underlying panel support beam;

a hold down clip member having a lower planar portion and an upper portion shaped to hook over the male side lap joint portion of the roof panel, the lower planar portion having an aperture therethrough; and bolt means extending through the aperture in the hold down clip member for pivotally securing the standoff clip member to the clip support member.

22. The standing seam roof assembly of claim 21 wherein the retaining means comprises:

at least one retaining strut disposed to extend between the tab engaging protrusions above the retaining tabs to strengthen the medial panel portion from lateral flexing in the assembled position.

23. The standing seam roof assembly of claim 22 wherein the retaining means comprises:

adhesive means disposed beneath and adhering to the underside of the roof panel and adhering to the upper support surface of the panel support beam for preventing lateral flexing of the medial panel portion in the assembled position.

24. The standing seam roof assembly of claim 23 wherein the panel flat of the roof panel is formed to have a shoulder portion at the edge of the adhesive means to resist edge separation of the adhesive means.

* * * * *